US009559544B2

(12) United States Patent
Jakubowski

(10) Patent No.: US 9,559,544 B2
(45) Date of Patent: Jan. 31, 2017

(54) WIRELESS INTERROGATION AND WIRELESS CHARGING OF ELECTRONIC DEVICES

(71) Applicant: Daniel B. Jakubowski, Plymouth, MI (US)

(72) Inventor: Daniel B. Jakubowski, Plymouth, MI (US)

(73) Assignee: Jay Marketing Associates, Inc., Plymouth, MI (US)

( * ) Notice: Subject to any disclaimer, the term of this patent is extended or adjusted under 35 U.S.C. 154(b) by 456 days.

(21) Appl. No.: 13/840,795

(22) Filed: Mar. 15, 2013

(65) Prior Publication Data

US 2014/0266025 A1 Sep. 18, 2014

(51) Int. Cl.
H02J 7/02 (2016.01)
H02J 5/00 (2016.01)

(52) U.S. Cl.
CPC ............. H02J 7/025 (2013.01); H02J 5/005 (2013.01); H02J 50/10 (2016.02)

(58) Field of Classification Search
CPC .................................................. H02J 7/025
USPC ........................................................ 320/108
See application file for complete search history.

(56) References Cited

U.S. PATENT DOCUMENTS

| 5,537,105 | A | * | 7/1996 | Marsh et al. | 340/10.32 |
| 5,734,254 | A | | 3/1998 | Stephens | |
| 5,952,814 | A | | 9/1999 | Van Lerberghe | |
| 6,130,602 | A | * | 10/2000 | O'Toole et al. | 340/10.33 |
| 6,184,651 | B1 | | 2/2001 | Fernandez | |
| 6,466,131 | B1 | * | 10/2002 | Tuttle et al. | 340/572.7 |
| 6,844,702 | B2 | | 1/2005 | Giannopoulos | |
| 6,906,495 | B2 | | 6/2005 | Cheng | |
| 6,917,182 | B2 | | 7/2005 | Burton | |
| 7,109,682 | B2 | | 9/2006 | Takagi | |
| 7,151,357 | B2 | | 12/2006 | Xian | |
| 7,180,265 | B2 | | 2/2007 | Naskali | |
| 7,791,311 | B2 | | 9/2010 | Sagoo | |
| 8,193,764 | B2 | | 6/2012 | Jakubowski | |
| 8,854,224 | B2 | * | 10/2014 | Kirby et al. | 340/636.1 |
| 2005/0110612 | A1 | * | 5/2005 | Carrender | 340/10.1 |
| 2005/0134213 | A1 | | 6/2005 | Takagi | |
| 2009/0039828 | A1 | * | 2/2009 | Jakubowski | 320/106 |
| 2009/0143104 | A1 | * | 6/2009 | Loh et al. | 455/558 |
| 2011/0115430 | A1 | * | 5/2011 | Saunamaki | 320/108 |
| 2011/0127954 | A1 | | 6/2011 | Walley | |
| 2011/0221385 | A1 | | 9/2011 | Partovi | |
| 2012/0013295 | A1 | | 1/2012 | Yeh | |

(Continued)

Primary Examiner — Samuel Berhanu
Assistant Examiner — Tessema Kebede
(74) Attorney, Agent, or Firm — Guntin & Gust, PLC; Ralph Trementozzi

(57) ABSTRACT

A system that incorporates teachings of the subject disclosure may include, for example, wireless chargers combined with wireless interrogators. The wireless chargers can transmit power wirelessly, while also wirelessly interrogating a nearby transponder, such as an RFID tag. The wireless chargers with wireless interrogators can also be programmable to allow user-implemented rules operable in response to an interrogation. Such rules can impose restrictions upon whether wireless charging is allowed to take place. Such rules can also be used to select a power-transmitting protocol that is particularly suited for the electronic device being charged. Other embodiments are disclosed.

21 Claims, 12 Drawing Sheets

(56) References Cited

U.S. PATENT DOCUMENTS

| | | |
|---|---|---|
| 2012/0235636 A1 | 9/2012 | Partovi |
| 2013/0026982 A1 | 1/2013 | Rothenbaum |
| 2013/0043835 A1 | 2/2013 | Yoon |
| 2014/0074702 A1* | 3/2014 | Kosak et al. .................. 705/40 |

* cited by examiner

WIRELESS INTERROGATION AND WIRELESS CHARGING OF ELECTRONIC DEVICES

RELATED APPLICATION(S)

U.S. Pat. No. 8,193,764, filed Aug. 8, 2007, by Daniel Benjamin Jakubowski, entitled "Wireless Charging of Electronic Devices." All sections of the aforementioned patent are incorporated herein by reference in its entirety.

FIELD OF THE DISCLOSURE

The subject disclosure relates to wireless interrogation and wireless charging of electronic devices.

BACKGROUND

Wireless power transmission or wireless energy transfer is generally the process that takes place in any system where electrical energy is transmitted from a power source to an electrical load, without interconnecting wires. Devices that utilize wireless power transmission to charge or recharge a battery in an electronic device (e.g., cellular phone) are commonly referred to as wireless chargers or contact-less chargers.

Wireless chargers known in the art are typically placed on a surface such as the surface of a desktop or a countertop. An electronic device can then be placed on the wireless charger to charge the electronic device. Alternately, a wireless charger may be placed on the underside of a desktop or countertop. A user of the wireless charger can then place the electronic device to be charged on the desktop or countertop within range of the wireless charger. By within range it is herein meant that the electronic device to be charged is sufficiently close to the wireless charger such that the electronic device can receive power wirelessly transmitted from the wireless charger. In this manner, the user of the wireless charger does not see the wireless charger because the wireless charger is underneath the desktop or countertop. The user sees only the electronic device that the wireless charger is charging.

Wireless interrogation systems can include transceivers to generate wireless interrogation signals. Sometimes the transponders are referred to as "readers." Transponders within wireless range can be configured to generate a wireless reply signal in response to the wireless interrogation signal. The transceivers can detect information encoded on the wireless reply signals.

Wireless interrogation systems can be distinguished according to three general categories: passive reader-active tag; active reader-passive tag; and active reader-active tag. Examples of active readers include transponders that generate wireless interrogation signals, for example, by way of radio frequency or light wave transmitters. Examples of passive tags include tags that provide back scatter signals including encoded information obtained from the tags. Examples of passive tags include bar codes and Q codes. Backscatter obtained by way of light wave reflections can be used to detect information encoded onto such passive tags. Examples of active tags include devices that are self-powered or obtain power from the interrogation signal. Such active tags use the power to generate a wireless reply signal, such as a radio frequency signal.

BRIEF DESCRIPTION OF THE DRAWINGS

Reference will now be made to the accompanying drawings, which are not necessarily drawn to scale, and wherein.

DETAILED DESCRIPTION

Figure 1:
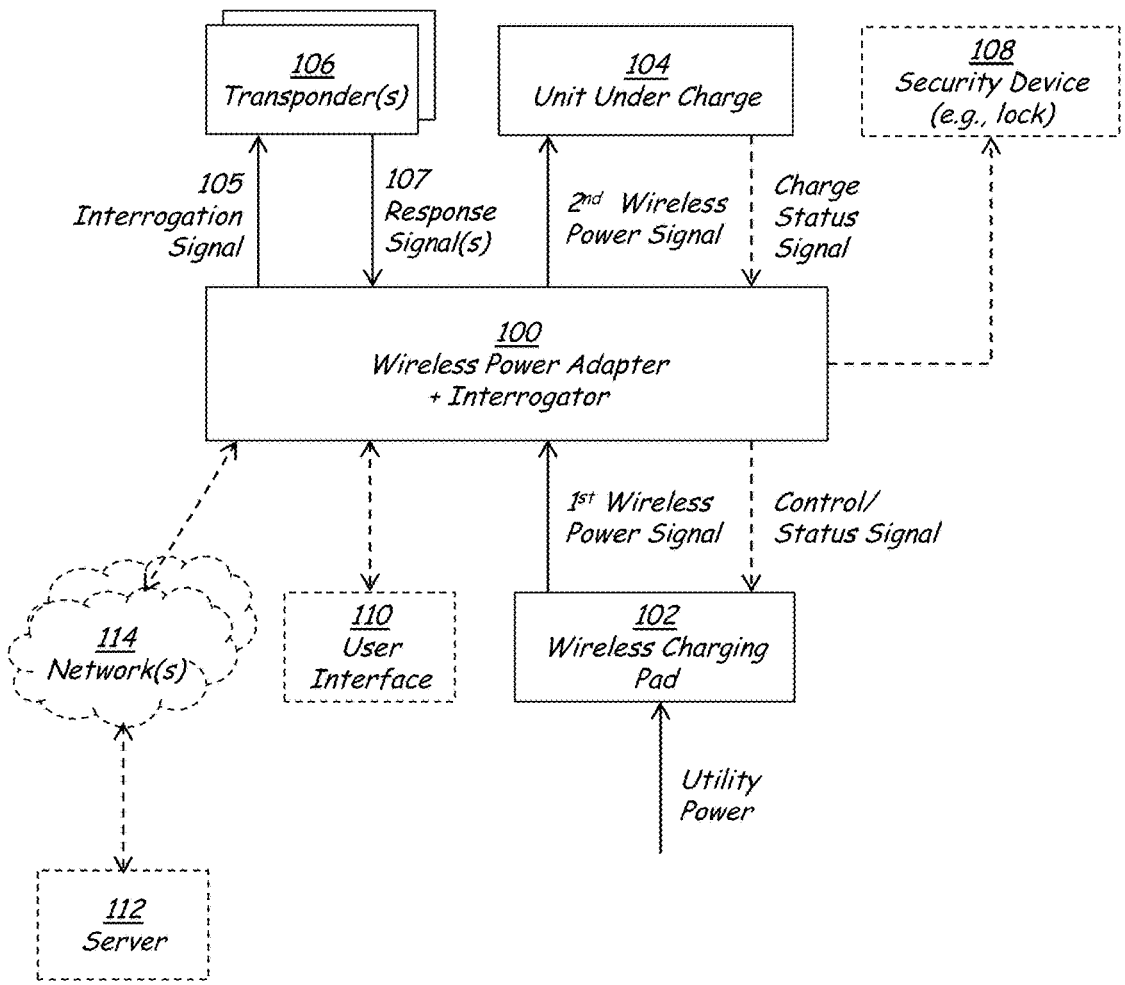
FIG. 1 shows a functional block diagram of a combined wireless charger-and-interrogator in accordance with embodiments of inventive matter disclosed herein.

The subject disclosure describes, among other things, illustrative embodiments of wireless interrogation and wireless charging of electronic devices. Other embodiments are included in the subject disclosure.

One embodiment of the subject disclosure includes a wireless charger having a housing containing a wireless power-receiving device. The wireless power-receiving device includes receive circuitry and a receive coil located within the housing. The wireless charger also contains a separate wireless power-transmitting device including transmit circuitry and a transmit coil, also located within the housing. The power-handling controller includes electronic hardware connecting the receive circuitry with the transmit circuitry to transfer the power received by the wireless power-receiving device to the wireless power-transmitting device. The wireless charger also includes interrogation circuitry in communication with the transmit coil. The interrogation circuitry includes signal transmitting circuitry to cause the transmit coil to generate a wireless interrogation signal. The interrogation circuitry also includes signal-receiving circuitry to obtain information from a wireless interrogation response signal in response to the transmit coil receiving the wireless interrogation response signal. The wireless charger is capable of simultaneously receiving power wirelessly and transmitting the power wirelessly from the power-transmitting device outside of the wireless charger. The wireless charger is also capable of accomplishing at least one of transmitting the wireless interrogation signal and obtaining the information from the wireless interrogation response signal.

Another embodiment of the subject disclosure includes a process that includes receiving a first wireless power signal by way of a power-receiving coil. A transmitting coil-drive current is generated responsive to the receiving of the first wireless power signal. A second wireless power signal is generated by way of a power-transmitting coil, in response to the generating of the transmitting coil-drive current. A wireless interrogation signal is transmitted by way the power-transmitting coil, to cause a transponder to generate a wireless interrogation reply signal. The wireless interrogation reply signal is received by way of the power-transmitting coil.

Yet another embodiment of the subject disclosure includes a wireless-charging system, including a power-receiving coil. The power-receiving coil generates an electrical current in response to a first wireless power signal. Power conversion circuitry is coupled to the power-receiving coil to convert the electrical current to a coil-driving current. A power-transmitting coil is coupled to the power conversion circuitry to transmit a second wireless power signal responsive to the coil-driving current. The power-transmitting coil is also configured to transmit an interrogation signal to cause a transponder to generate a wireless reply signal, and to receive the wireless reply signal. A controller is provided in communication with the power-transmitting coil. The controller includes a memory to store computer instructions and a processor in communication with the memory. The processor, responsive to executing the computer instructions, performs operations including determining from the wireless reply signal that the transponder is proximate to the power-transmitting coil.

In accordance with particular embodiments of inventive matter disclosed herein, combined wireless charger-and-interrogators are provided. Generally, these combined wireless charger-and-interrogators comprise both a wireless power-receiving device and a wireless power-transmitting device, although some embodiments can include a wireless power-transmitting device without necessarily having a wireless power-receiving device. The wireless power-transmitting device provides a wireless power signal suitable for supplying electrical power wirelessly to another unattached electrically powered device, as may be useful for providing power to allow for operation of the other device. Having both a wireless power-receiving device and a wireless power-transmitting device allows the wireless chargers to simultaneously receive power from an unattached electrical power source and to transmit power derived from the unattached electrical power source to the unattached electrical device.

The wireless interrogators can communicate wirelessly with other unattached wireless communication devices, such as near-field communication devices and transponders, including radio frequency identification (RFID) transponders, sometimes referred to as "tags." Unattached wireless communication devices, or transponders, can provide wireless reply signals in response interrogation by wireless interrogation signals provided by the wireless interrogators. In at least some embodiments, wireless power transmissions of the wireless chargers are adjusted in response to such responses to wireless interrogation signals. As disclosed herein, various other features can be controlled in response to one or more of the wireless interrogation or the wireless power charging.

The wireless chargers can include controllers that are capable of controlling one or more aspects of a transfer power received by the wireless power-receiving devices to the wireless power-transmitting devices. The controllers can also be configured to cooperate with the wireless interrogators, for example, by originating interrogation messages, by interpreting responses to the interrogation messages, or by controlling aspects associated with the transfer of power in response to such interrogation responses. In at least some embodiments, the wireless chargers also include housings that contain the components, modules, and/or subsystems of the wireless chargers. The housings allow the wireless chargers to be portable. In particular embodiments, the wireless chargers can comprise additional components and features as described herein.

FIG. 1 shows a diagram of an example combined wireless charger-and-interrogator in accordance with embodiments of inventive matter disclosed herein. A combined wireless charger-and-interrogator 100 receives a first wireless power signal from another unattached wireless charging device, such as a wireless charging pad 102. The wireless charging pad 102 can receive electrical power from a suitable power source, such as facility power originating from a utility power provider, from a battery, and/or from local power generation. The combined wireless charger-and-interrogator 100 transmits a second wireless power signal to an unattached device or unit to be charged, sometimes referred to as a unit under charge 104, particularly when engaging in wireless power charging. The second wireless power signal is configured to provide sufficient electrical power to allow for operation of the unit under charge 104. For example, the second wireless power signal can be used to charge a power storing device, such as a battery, of the unit under charge 104, which, in turn, provides electrical power to the unit under charge 104.

The combined wireless charger-and-interrogator 100 also transmits a wireless interrogation signal 105. The wireless interrogation signal 105, when intercepted by a transponder 106 within wireless range of the wireless interrogation signal 105, causes the transponder 106 to emit a wireless response signal 107. The transponder 106 can be attached to or integral with the unit under charge 104. Alternatively or in addition the transponder 106 can be separate from the unit under charge 104, for example being placed on another person or movable object. The combined wireless charger-and-interrogator 100 receives the wireless response signal 107. Wireless response signals 107 from the transponders 106 typically provide a means of identification, such as an identification code that may, in some instances, be unique. Such identification codes allow the combined wireless charger-and-interrogator 100 to distinguish wireless reply signals 107 from multiple transponders 106 or RFID tags. In at least some embodiments the interrogation signal and response signals occur during the wireless charging of the unit under charge 104.

A user interface 110 can be provided in combination with, or integral to, the combined wireless charger-and-interrogator 100. The user interface 110 can be used, for example, in operating, configuring, and/or maintaining the combined wireless charger-and-interrogator 100. The user interface 110 can include a user entry device such as keyboards, keypads, touchscreens, pointing devices and the like and user feedback devices, such as alphanumeric displays, graphical displays, indicator lights, audio alerts and the like.

The combined wireless charger-and-interrogator 100 can also include one or more communication interfaces, such as a telecommunication interface and/or a network interface allowing communication with remote devices such as a remote server 112 through one or more networks 114. The server 112 can be configured to support one or more aspects of operation of the combined wireless charger-and-interrogator 100 and/or operation of other features in response to operation of the combined wireless charger-and-interrogator 100. In some embodiments, the server 112 can include one or more applications, such as any of the example applications disclosed herein.

In some embodiments the combined wireless charger-and-interrogator 100 is in communication with one or more other devices such as a security device 108. The security device 108 can include a locking mechanism that is monitored and/or control by the combined wireless charger-and-interrogator 100. The security device 108 can be physically coupled to the combined wireless charger-and-interrogator 100, for example by a wire harness or cable. Alternatively or in addition, the security device 108 can be wirelessly coupled to the combined wireless charger-and-interrogator 100, for example, by a wireless communication link. Such wireless communication links can include IEEE.802.11 compliant wireless links, such as Wifi®, Bluetooth®, etc. In some embodiments, the security device 108 is communicatively coupled to the combined wireless charger-and-interrogator 100 by a network, such as a local area network, e.g., Ethernet, or a wide area network, such as a telecommunications network, and/or the Internet. The security device 108, or locking mechanism, can be controlled to selectively block or unlock according to interrogation response signals, charge status signals, external signals received via the network interface or combinations of such signals.

Figure 2:
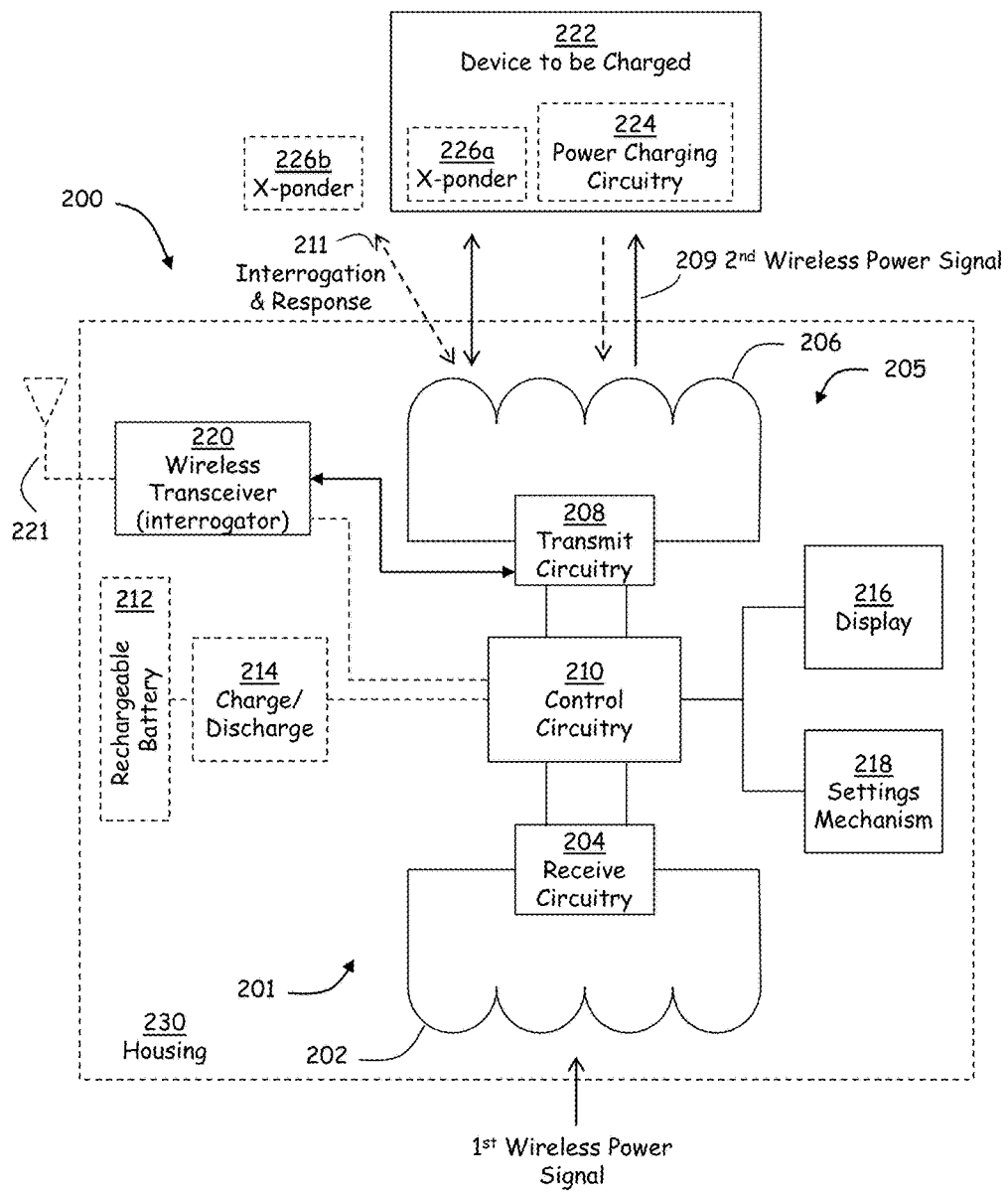
FIG. 2 shows a schematic diagram of a combined wireless charger-and-interrogator in accordance with embodiments of inventive matter disclosed herein.

FIG. 2 shows a schematic diagram of an example combined wireless charger-and-interrogator 200 in accordance with embodiments of inventive matter disclosed herein. The combined wireless charger-and-interrogator 200 includes wireless power-receiving device 201 including a receive coil 202 and receive circuitry 204. Wireless power-receiving devices 201 useful in the combined wireless charger-and-interrogator 200 can be manufactured and used in accordance with technology known in the art for producing wireless power-receiving devices. For example, the receive circuitry 204 can rectify an alternating voltage induced in the receive coil 202 by a first wireless power signal resulting in a substantially constant, notwithstanding ripple, or direct current voltage.

Analogously, a wireless power-transmitting device 205 can include a transmit coil 206 and transmit circuitry 208. Wireless power-transmitting devices useful in the combined wireless charger-and-interrogator 200 can also be manufactured and used in accordance with technology known in the art for producing wireless power-transmitting devices. For example, the transmit circuitry 208 can produce an alternating voltage and/or current, having a predetermined frequency, amplitude, duty cycle, etc., from a voltage and/or current, including direct current or substantially constant values of voltage and/or current supplied to the transmit circuitry 208 during operation of the combined wireless charger-and-interrogator 200 and supply the produced alternating voltage to the transmit coil 206. Also by way of example, the transmit circuitry 208 can produce a predetermined level of intensity of an inductive and/or radiated field of the transmit coil 206. The inductive and/or radiated field of the transmit coil 206 gives rise to a second wireless power signal 209.

An unattached electronic device-to-be-charged 222 can be positioned with a wireless range of the combined wireless charger-and-interrogator 200. When so positioned, the device-to-be-charged 222 can derive electrical power from the second wireless power signal 209. For example, the electronic device-to-be-charged 222 can be configured to include or be combined with power-charging circuitry 224 adapted to convert an intercepted portion of the second wireless power signal 209 into usable electrical power as may be used to operate the device 222 or charge a power storage device, such as a batter, to provide such electrical power for operation of the device 222.

The combined wireless charger-and-interrogator 200 includes a wireless transceiver 220. The wireless transceiver is in communication with the wireless power transmitting device 205, for example, through one or more of the transmit circuitry 208 and the transmit coil 206. The wireless transceiver or interrogator 220 generates an interrogation signal. The interrogation signal causes the wireless power transmitting device 205 to emit a wireless interrogation signal 211. The wireless interrogation signal 211 when intercepted by one or more transponders 226a and/or 226b, causes the one or more transponders 226a, 226b to respectively emit a wireless reply signal. In at least some embodiments the wireless reply signal is intercepted by the transmit coil 206 of the wireless power transmitting device 205 and/or separate antenna 221 (shown in phantom). The intercepted wireless reply signal can be routed to a receiver portion of the wireless transceiver 220, for example, through the transmit circuitry 208. Being so configured the wireless transceiver 220 of the combined wireless charger-and-interrogator 200 can interrogate remote, unattached transponders 226a, 226b using the common transmit coil 206. It is envisioned that in at least some embodiments the wireless transceiver 220 can communicate with remote transponders 226a and/or 226b by way of a separate coil and/or antenna in combination with or instead of the transmit coil 206.

The control circuitry 210 of the combined wireless charger-and-interrogator 200 can be configured to control operation of the combined wireless charger-and-interrogator 200 as described herein. The control circuitry 210 can comprise hardware alone (e.g., circuitry) or can include both hardware and software. The control circuitry 210 can be implemented by one of ordinary skill in the electronic arts without undue experimentation using technology that is known in the art. This technology can include, for example, application specific integrated circuits (ASICS), a microprocessor executing code that is designed to implement one or more of the functions and methods described herein, programmable logic arrays, digital signal processors, etc. Examples of control circuitry 210 are disclosed in U.S. Pat. No. 8,193,764, incorporated herein by reference in its entirety.

The control circuitry 210 can be in electrical communication between the wireless power receiving device 201 and the wireless power transmitting device 205 and configured to transfer electrical power wirelessly received by the wireless power-receiving device 201 to the wireless power-transmitting device 205. In some embodiments, the control circuitry 210 can transfer electrical power directly from the wireless power-receiving device 201 to the wireless power-transmitting device 205. For example, the control circuitry 210 can supply the transmit circuitry 208 with direct current voltage and/or current provided to the control circuitry 210 from the receive circuitry 204.

In particular embodiments, the combined wireless charger-and-interrogator 200 can additionally comprise a rechargeable battery. For example, the combined wireless charger-and-interrogator 200 includes a rechargeable battery 212 and charge/discharge circuitry 214. The control circuitry 210 can transfer power received wirelessly by the wireless power-receiving device to the rechargeable battery 212 instead of transferring the power directly to the wireless power-transmitting device. The combined wireless charger-and-interrogator 200 includes charge/discharge circuitry 214 in communication with the rechargeable battery 212 and the control circuitry 210 that controls the charging and discharging of the rechargeable battery 212. When the rechargeable battery 212 is charged, the control circuitry 210 can transfer power from the rechargeable battery 212 to the wireless power-transmitting device. For example, the control circuitry 210 can supply the transmit circuitry 208 with direct current voltage provided to the control logic 210 by the charge/discharge circuitry 214.

In particular embodiments, the combined wireless charger-and-interrogator 200 can include other features and components, such as a display mechanism 216 for providing a user with an indication of the operating status of the wireless charger and a settings mechanism 218 providing a user of the wireless charger with ability to select parameters for the operation of the combined wireless charger-and-interrogator 200 as disclosed herein.

In particular embodiments, the control circuitry 210 is capable of operating the wireless power-transmitting device of the combined wireless charger-and-interrogator 200 to wirelessly transmit power in accordance with a selectable power-transmitting protocol. These embodiments are referred to herein as programmable embodiments. In particular embodiments, the power-transmitting protocol is selected by a user of the combined wireless charger-and-interrogator 200. In particular embodiments, the power-transmitting protocol can be selected by the electronic device to be charged 222.

In particular embodiments, a selectable power-transmitting protocol can include, for example, a particular frequency at which the transmit circuitry 208 produces an alternating voltage that the transmit circuitry 208 supplies to the transmit coil 206. Thus, selecting a first power-transmitting protocol can cause the transmit circuitry 208 to produce an alternating voltage at a particular frequency and selecting a second power-transmitting protocol may cause the transmit circuitry 208 to produce and alternating voltage at a different frequency. Analogously, a particular power-transmitting protocol may include, for example, a particular level of intensity of an inductive field for the transmitting coil 206. Thus, selecting a first power-transmitting protocol may cause the transmit circuitry 208 to produce a particular level of intensity of the inductive field, whereas selecting a second power-transmitting protocol may cause the transmit circuitry 208 to produce a different level of intensity for the inductive field. Other aspects of any such power-transmitting protocol can include, without limitation, frequency, duty cycle, pulse shape, pulse position, quality, or Q factor, inductance, tolerances of any of such features, such as Q tolerance or inductance tolerance, etc. It is understood that one or more aspects of any of the wireless transfer protocols discussed herein can be defined or otherwise specified in one or more standards, or otherwise identified, for example, by such organizations as the Alliance for Wireless Power (http://www.a4wp.org/), and Qi, a standard for wireless charging promoted by the Wireless Power Consortium (http://www.wirelesspowerconsortium.com).

In particular embodiments, the wireless interrogator 220 including a wireless communication device can be used to identify one or more power-transmitting protocols for the electronic device to be charged 222. By way of illustrative example, the electronic device to be charged 222 includes a transponder 226a, such as in RFID tag. In response to wireless interrogation, the RFID tag 226a provides a wireless reply signal encoded with an identification code. In some embodiments, identification code includes a field that identifies one or more power transmitting protocols suitable for use with the device to be charged 222. In particular embodiments, the received information may be a single numeric value that the control circuitry recognizes as being associated with a particular power-transmitting protocol. In other embodiments, the received information may include values that correspond to parameters of a power-transmitting protocol, such as the frequency of alternating voltage and the intensity of the inductive field as discussed above. Alternatively or in addition, the identification code can be used to identify such suitable power transmitting protocols by reference, e.g., using a lookup table.

Alternatively or in addition, the control circuitry 210 is capable of associating a selectable button of the settings mechanism 218 with a power-transmitting protocol identified by a received identification. In this manner, a user of the wireless charger 210 places an electronic device to be charged 222 within wireless range of the combined wireless charger-and-interrogator 200 and selects a power-transmitting protocol (e.g., by selecting a button) that is suited for charging the electronic device 222.

Figure 3A:
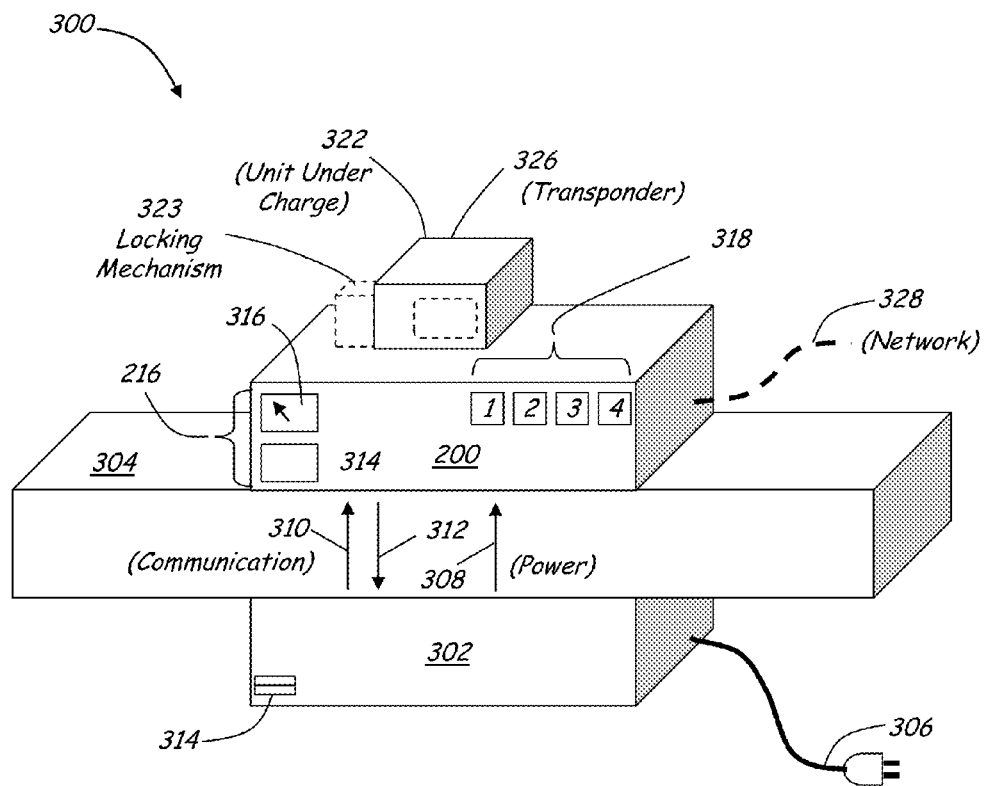
FIGS. 3A and 3B provides perspective views of a combined wireless charger-and-interrogator systems in-use, in accordance with embodiments of inventive matter disclosed herein.

FIG. 3A illustrates a perspective view of a charging system 300 utilizing the combined wireless charger-and-interrogator 200 of FIG. 2 in conjunction with another wireless charger 302 in accordance with embodiments of inventive matter disclosed herein. FIG. 3A shows a first wireless charger 302 positioned underneath a portion of a supporting platform, such as a desktop 304, with the combined wireless charger-and-interrogator 200 positioned on top of the desktop 304.

The first wireless charger 302 comprises a power cord 306 through which the first wireless charger 302 can receive conducted electrical power from a standard power source, such as a 120 Volt utility outlet commonly found in residential and office buildings or a 12 Volt source as is commonly used in the auto industry. The first wireless charger 302 is capable of wirelessly transmitting power by way of a first wireless power signal 308 through the desktop 304 to the second combined wireless charger-and-interrogator 200. The second combined wireless charger-and-interrogator 200, in turn, is capable of receiving the wirelessly transmitted power by way of the first wireless power signal 308. The wireless power-receiving device 201 (FIG. 2) of the second combined wireless charger-and-interrogator 200 can receive the wirelessly transmitted power.

In particular embodiments, the first wireless charger 302 is capable of wirelessly transmitting communications 310 and the second combined wireless charger-and-interrogator 200 is capable of receiving the wirelessly transmitted communications 310. In particular embodiments, the second combined wireless charger-and-interrogator 200 is capable of wirelessly transmitting communications 312 and the first wireless charger 302 is capable of receiving the wirelessly transmitted communications 312. The first wireless charger 302 also includes a communications port 314 (e.g., a USB port) that allows the first wireless charge 302 to be communicatively connected, for example, to a computer or directly to a network (e.g., the internet). The first wireless charger 302 can receive power-transmitting protocols via the communications port 314 and wirelessly communicate the protocols to the second combined wireless charger-and-interrogator 200 so that the second combined wireless charger-and-interrogator 200 can associate each received protocol with a selectable button, e.g., of the settings mechanism 218.

A user of the second combined wireless charger-and-interrogator 200 can charge an electronic device 322 by placing the electronic device to be charged 322 within range of the wireless power-transmitting device 205 (FIG. 2) of the combined wireless charger-and-interrogator 200. The user can accomplish this, for example, by placing the electronic device to be charged 322 on top of the combined wireless charger-and-interrogator 200. The user equipment allows the user to select a particular power-transmitting protocol for charging the electronic device 322 by allowing selection of one of the selectable buttons of the settings mechanism 318.

The second combined wireless charger-and-interrogator 200 can be portable. Thus, the combined wireless charger-and-interrogator 200 can still be used to charge electronic devices 322 even if it is removed from within range of the first wireless charger 302. For example, a user may wish to take the combined wireless charger-and-interrogator 200 with them to charge an electronic device while they are traveling. The battery indicator 314 will indicate to the user when the combined wireless charger-and-interrogator 200 itself needs to be recharged. When the user returns from traveling, the user can place the combined wireless charger-and-interrogator 200 within range of the first wireless charger 302 so that the second combined wireless charger-and-interrogator 200 can be recharged, if necessary. Since the first wireless charger 302 can be positioned out of sight on the underneath side of the desktop 304, the user can use a charging indicator 316, e.g., a light, to determine when the second wireless charge 200 is within range of the first wireless charger 302.

Figure 3B:
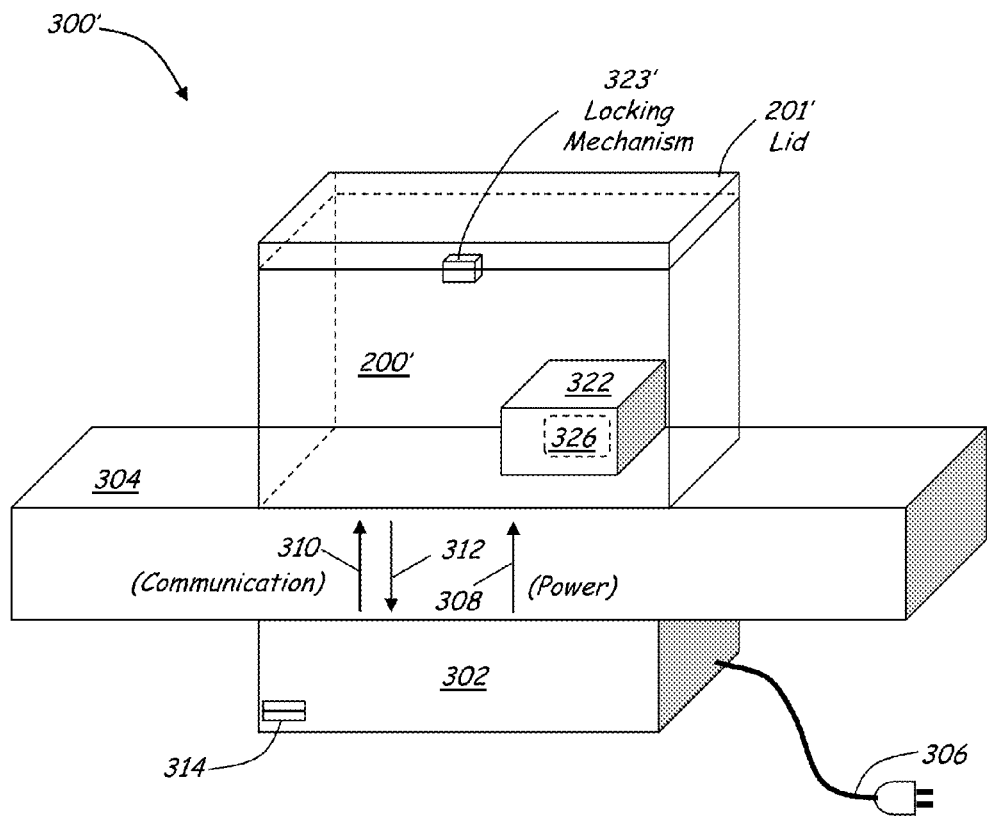

Referring next to FIG. 3B, a charger and interrogator is provided in combination with a container. The wireless charger-and-interrogator, for example, can provide container 200' by extending its housing 230 (FIG. 2) to define a relatively large cavity, or adding an extension to the housing 230 to define the cavity for holding items, such as one or more devices to be charged. In some embodiments, the wireless charger-and-interrogator 200 (FIG. 2) and container 200' are formed as an assembly. The container 200', for example, can be an open container, as in a shelf, a bin or a trough, or in the form of a closed or closeable container, such as a briefcase, a suitcase, a handbag, safe, storage locker, and the like. In the illustrative example, the container 200' includes a lid 201' that can be opened and closed. A unit to be charged can be placed into the interior cavity of the container 200', and charged by the wireless power charging signal while inside the container whether the container 200' is open, closed or locked.

In at least some embodiments, a locking mechanism 323' can be provided to allow for controllable access to the interior cavity of the container 200'. Such locking mechanism 323' can be controlled, for example, by any of the techniques disclosed herein related to security and/or operation of locking mechanisms. Alternatively or in addition, the locking mechanism 323' can be controlled by a separate device, such as a key, a key fob, and the like.

Figure 4:
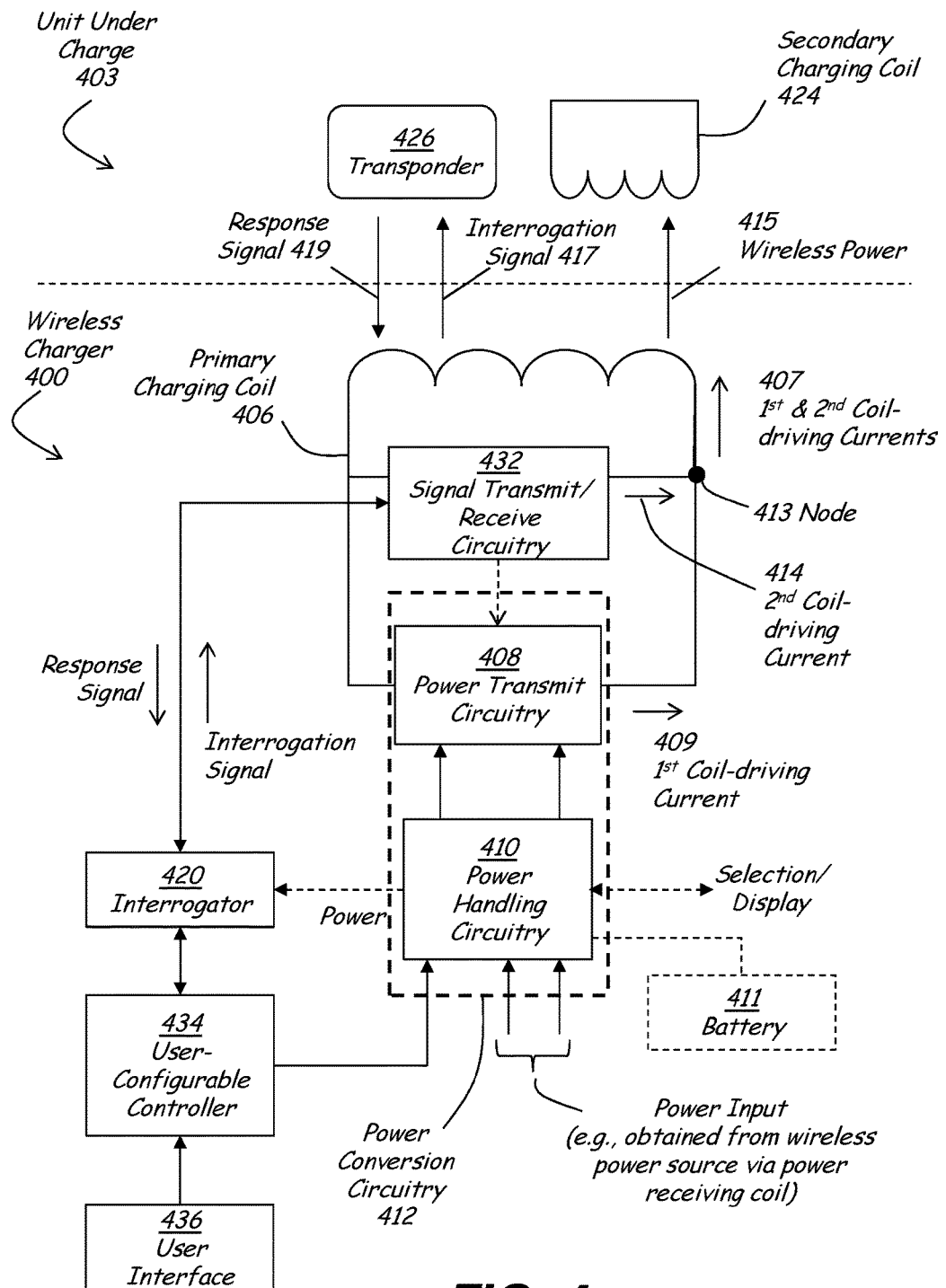
FIG. 4 shows a schematic diagram of a combined wireless charger-and-interrogator in accordance with embodiments of inventive matter disclosed herein.

FIG. 4 illustrates in more detail an embodiment of a combined wireless charger-and-interrogator device 400. The device 400 includes the primary charging coil 406. The primary charging coil 406 is energized by a coil driving current 407. The device 400 includes power conversion circuitry 412 coupled between a power source and the primary charging coil. The power conversion circuitry 412 can include power handling circuitry 410 and power transmit circuitry 408 coupled to the primary charging coil 406. In the illustrative example the power transmit circuitry 408 provides a first current portion 409 of the coil driving current. The device 400 also includes signal transmit/receive circuitry 432. In the illustrative example the signal transmit/receive circuitry 432 provides a second current portion 411 of the coil driving current. In the example configuration, the first coil driving current portion 409 and the second coil driving current portion 411 are summed at a current node 413 to form the coil driving current 407.

The device 400 includes power handling circuitry 410 coupled to the power transmit circuitry 408. In at least some embodiments, the device 400 also includes one or more batteries 414. The power handling circuitry 410 can obtain electrical power from an external source such as conducted facility power and/or a received wireless power signal. The power handling circuitry 410 can be configured to provide the first coil driving current portion 409 suitable for generating a wireless power signal 415 according to a particular wireless power protocol. The wireless power signal 415 can be intercepted by an unattached secondary charging coil 424, for example a charging coil of a device to be charged 322 (FIG. 3A). In some embodiments, the device 400 includes circuitry for charging a battery 414, when present and/or managing other aspects of battery operation, such as controlling when the battery 414 is charging, and when the battery 414 is supplying power to other circuits of the wireless power charger, e.g., when power input is not available from another source, such as another wireless power source. Such circuitry can be included within the power handling circuitry 410, as illustrated, or provided by one or more other circuits or modules, either alone or in combination with the power handling circuitry 410.

In at least some embodiments the device 400 includes a user configurable controller 434. The user configurable controller 434 can be coupled to the power handling circuitry 410 allowing a user to control aspects of the power handling circuitry 410, such as identification of a particular wireless protocol. In order to facilitate user configuration of the user configurable controller 434, the device 400 can include a user interface 436 in communication with the user configurable controller 434.

And interrogator 420 is provided in communication with the signal transmit/receive circuitry 432. The interrogator 420 causes the signal transmit/receive circuitry 432 to generate the second coil driving current portion 411. In at least some embodiments the interrogator 420 causes the signal transmit/receive circuitry 432 to generate the second coil driving current portion 411 according to a particular interrogation protocol. The second coil driving current portion 411 causes the primary charging coil 406 to generate a wireless interrogation signal 417. The wireless interrogation signal 417 can be intercepted by an unattached transponder 426, such as a transponder 426 associated with or otherwise coupled to the unit under charge 403, such as the device to be charged 322 illustrated in FIG. 3A.

The transponder 426, when positioned within wireless range of the interrogation signal 417, produces a wireless response signal 419. The primary charging coil 406 intercepts a portion of the wireless response signal 419 when within wireless range of the wireless response signal 419. The intercepted portion of the wireless response signal 419 induces a wireless response current within the primary charging coil 406. The wireless response current can be detected by the signal transmit/receive circuitry 432. In at least some embodiments indications of the response signal detected by the signal transmit/receive circuitry 432 is routed to the interrogator 420. The interrogator 420 when provided in communication with the user configurable controller 434 can provide indications of the response signal usable by the configurable controller 434. For example the user configurable controller can be preconfigured to adjust the first coil driving current portion 409 in reaction to the response signal by way of the power handling circuitry 410 and the power transmit circuitry 408. Such adjustments can include one or more of activation of the power transmit circuitry 408 to produce the first coil driving current portion 409, deactivation of the power transmit circuitry 408 to terminate the first coil driving current portion 409, adjustment of the power transmit circuitry 408 to increase and or decrease the first coil driving current portion 409.

Figure 5A:
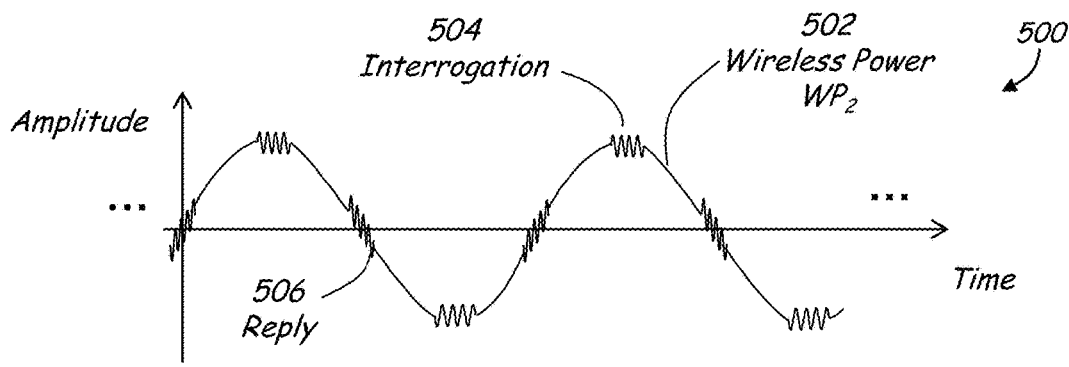
FIGS. 5A and 5B illustrate waveforms of alternative forms of wireless signals provided by a combined wireless charger-and-interrogator in accordance with embodiments of inventive matter disclosed herein.

FIG. 5A illustrates an example of a waveform 500 of the composite coil driving current 407 (FIG. 4). In the illustrative example, the coil driving current waveform 500 includes a first portion 502 to indicative of the first coil driving current 409 (FIG. 4). In the illustrative example, the first portion 502 to includes a first sine wave having a relatively large amplitude and a relatively large period. The coil driving current waveform 500 also includes a second portion 504 indicative of the second coil driving current 411 (FIG. 4). In the illustrative example, the second portion 504 includes a second sine wave having a relatively small amplitude in a relatively short period. In particular, the resulting waveform 500 includes the second portion 504 superimposed upon the first portion 502. A transponder, such as an RFID transponder can include one or more frequency-selective circuit elements, such as filters, e.g., tank circuits, to differentiate detection of a wireless signal related to the second portion 504 in the presence of a wireless signal related to the first portion 502. Such a waveform can be obtained by modulating the wireless power signal according to the wireless transponder signal. One or more of any suitable forms of modulation can be used as otherwise generally known.

The particular waveform 500 is provided for illustrative purposes only and should not be limiting to the possible waveforms and combinations of waveform parts. For example one or more of the first and second portions 502, 504 can include other shapes such as rectangular, triangular, trapezoidal, cosine squared, linear, and the like. Additionally the relative periods of the first and second portions 502, 504 can be greater or shorter without limitation that one portion be greater or shorter than the other portion. Nor is there any limitation whether either of the first and second portions 502, 504 a continuous, discontinuance, uniform, or otherwise. It is conceivable that in at least some embodiments the waveform 500 includes a third portion 506 indicative of a primary charging coil current induced by interception of a wireless response signal 419 (FIG. 4).

Figure 5B:
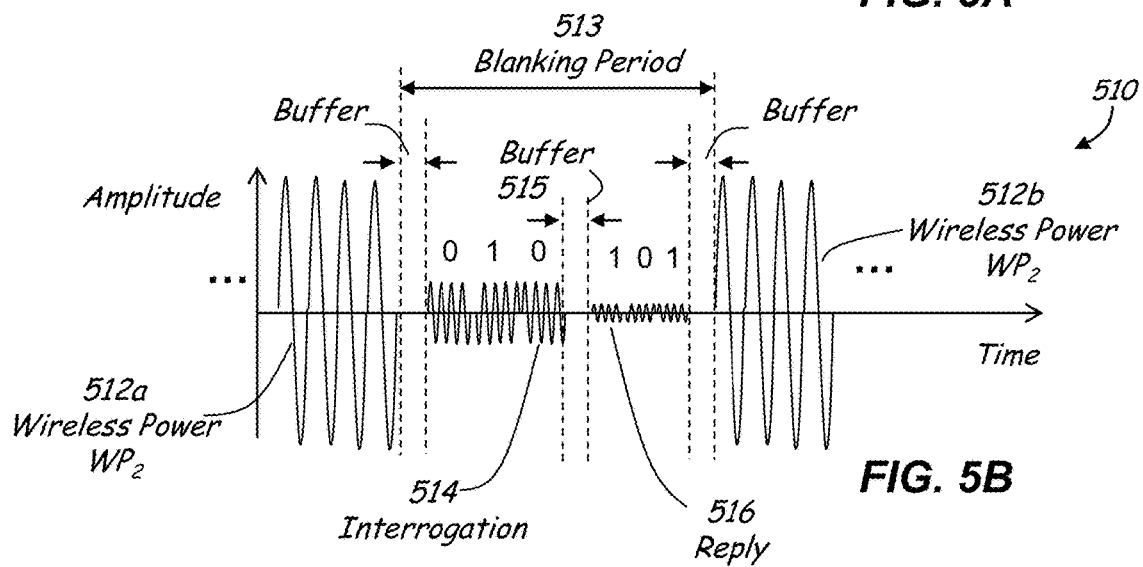

FIG. 5B illustrates another example of a waveform of the composite coil driving current 407 (FIG. 4). In the illustrative example, the coil driving current waveform 510 includes a first portion 512a, 512b, generally 512 indicative of the first coil driving current 409 (FIG. 4). In the illustrative example, the first portion 512 includes a first sine wave having a relatively large amplitude and a relatively large period. In the illustrative example, the first portion is discontinuous or otherwise divided into a first sub portion 512a and a second sub portion 512b separated by an intermediary blanking period 513—it is understood that other portions of the waveform 510 can include repeated blanking periods 513 between extended segments of wireless power signal. Such blanking periods can be characterized by a complete turn off of the first coil driving current portion 409, or a reduction of the amplitude of first coil driving current portion 409, e.g., by a factor of 2, 10, 100 or more. In at least some embodiments the waveform 510 includes a third portion 516 indicative of a primary charging coil current induced by interception of the wireless response signal 419 (FIG. 4). The reply signal of the third portion 516 is shown following the interrogation signal of the second portion 514, separated by a buffer period 515. It is understood that in at least some examples, the second portion 504 and the third portion 516 can overlap, such that the interrogation and response signals are simultaneously present. In such instances, the relative periods or frequencies of the second portion 514 and the third portion 516 can differ to allow for their separate interpretation by way of frequency selective components, such as filters and/or tank circuits. Such blanking periods can be advantageous in combination with low noise amplifiers on those portions of a transponder receiver circuit configured to receiver the wireless reply signal. As illustrated, the third portion 506 can similarly include an encoded message, such as another BPSK message encoding the digital value of "101." Although BPSK is used for illustrative purposes, it is understood that other signal encoding techniques can be included alone or in combination. By way of further example, such signal encoding techniques can include amplitude modulation, frequency modulation, phase modulation, pulse amplitude modulation, frequency shift keying, pulse position modulation, quadrature amplitude modulation, and the like.

Figure 5C:
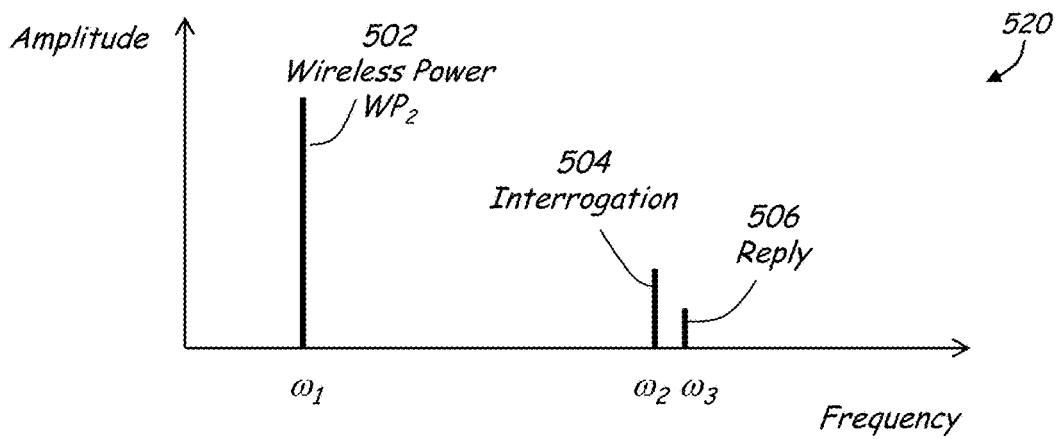
FIG. 5C illustrates a frequency spectrum of the wireless signal described by the waveform of FIG. 5A.

FIG. 5C illustrates an example of a frequency spectrum of the coil driving current waveform 500 illustrated in FIG. 5A. In particular, a first spectral component is provided at a first frequency $\omega_1$ indicative of the coil driving current portion 409 (FIG. 4) of the first portion 502. A second spectral component is provided at a second frequency $\omega_2$ indicative of the second coil driving current 411 (FIG. 4) of the second portion 504. A third spectral component is provided at a third frequency $\omega_3$ indicative of the primary charging coil current induced by interception of a wireless response signal 419 (FIG. 4) of the third portion 506. In the illustrative embodiment and without limitation, $\omega_3 > \omega_2 > \omega_1$.

Figure 6:
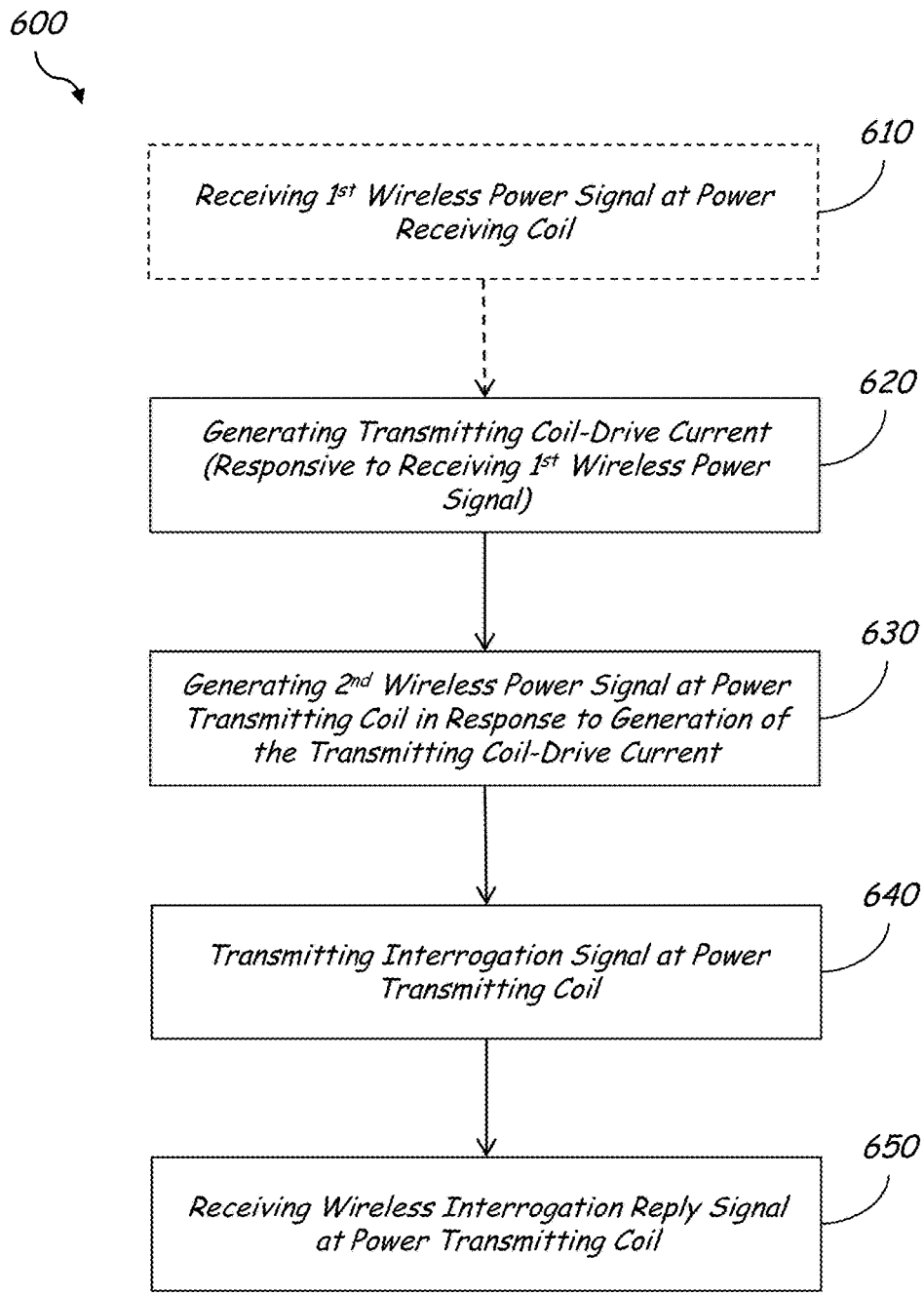
FIG. 6 illustrates operations performable by a programmable combined wireless charger-and-interrogator in accordance with embodiments of inventive matter disclosed herein.

FIG. 6 illustrates operations 600 performable by a combined wireless charger-and-interrogator in accordance with embodiments of inventive matter disclosed herein. The operations 600 comprise step 610 through step 650. In particular embodiments, the wireless charger may perform one or more steps simultaneously.

In step 610, the combined wireless charger-and-interrogator wirelessly receives power by way of a first wireless power signal at a first device located in a housing, the first device being a wireless power-receiving device. This step is shown in phantom to imply that in some embodiments in which the combined wireless charger-and-interrogator receives conducted electrical power (e.g., facility power), and/or operates from a separate power source, such as a battery source, step 610 can be omitted. It is also understood that the combined wireless charger-and-interrogator can charge one or more rechargeable batteries from other sources, including conducted electrical power and/or wireless power received in step 610, such that the charged batteries can power to allow for operation as disclosed herein without either conducted electrical power or a first wireless power signal. In step 620, the combined wireless charger-and-interrogator generates a transmitting coil-drive current. Generation of the transmitting coil-drive current is accomplished responsive to the receiving of the first wireless power signal for embodiments in which the first wireless power signal is received at a receiving coil of the combined wireless charger-and-interrogator. In step 630, the combined wireless charger-and-interrogator wirelessly transfers electrical power from the wireless power-transmitting device by way of a second wireless power signal generated in response to generation of the coil-drive current. In step 640, the combined wireless charger-and-interrogator generates a wireless interrogation signal. As disclosed herein, the wireless interrogation signal can be generated using a common coil and/or antenna as used in generation of the second wireless power signal. The wireless interrogation signal is configured to cause a transponder within wireless range of the wireless interrogation signal to generate a wireless reply signal. In step 650, the combined wireless charger-and-interrogator receives the wireless reply signal from the interrogated transponder.

Figure 7:
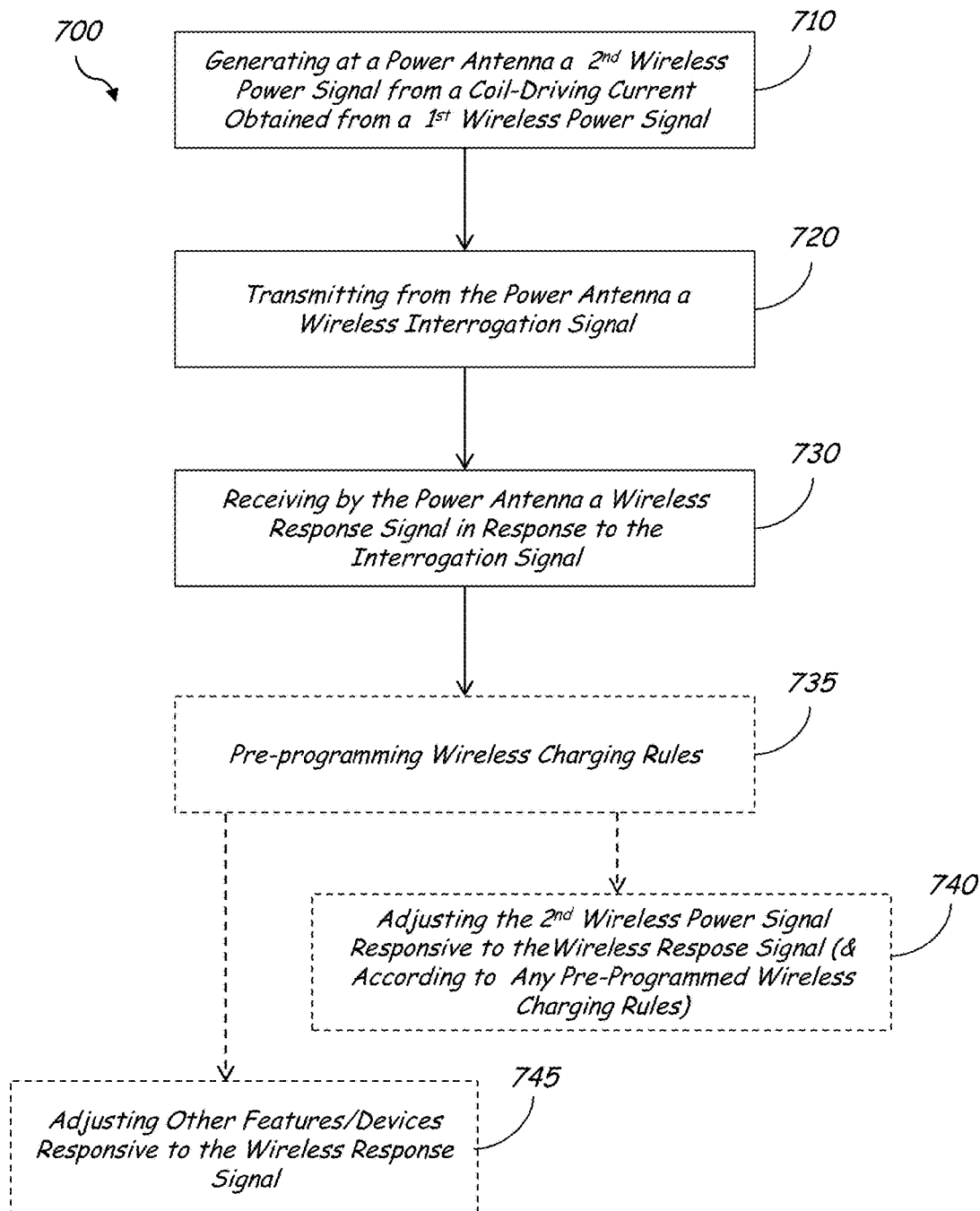
FIG. 7 illustrates operations performable by a programmable combined wireless charger-and-interrogator in accordance with embodiments of inventive matter disclosed herein.

FIG. 7 illustrates operations 700 performable by a combined wireless charger-and-interrogator in accordance with embodiments of inventive matter disclosed herein. The operations 700 comprise step 710 through step 745. In step 710 a wireless power signal is generated by way of a power-charging coil or antenna stimulated by a coil-driving current. In some embodiments the coil can be formed by one or more turns of an electrical conductor. The terms of the coil can be opened air or field at least partially with another material such as materials to promote efficient generation of electromagnetic fields. By way of example a coil filling material can include ferrite materials. Although reference is made herein to a single coil it is conceivable that an array of multiple coils can serve a similar purpose. When multiple coils are provided, they can be connected in series, in parallel, or in combinations of series and parallel arrangements. By way of example, a rectangular array of coils can be arranged to cover a surface of the combined wireless charger-and-interrogator. A device to be charged can be placed adjacent to such a rectangular array of coils. Other physical arrangements, such as non-planar arrangements, are envisioned without limitation.

In step 720, a wireless interrogation signal is generated, for example, by the power-charging coil. The wireless interrogation signal causes a transponder within a communication range of the wireless interrogation signal to generate a wireless response signal. In step 730, the wireless response signal is detected by the combined wireless charger-and-interrogator. In at least some embodiments the wireless response signal is intercepted or otherwise received by the power charging coil. In step 740 (shown in phantom), one or more features of the combined wireless charger-and-interrogator can be controlled, modified, or otherwise varied in response to the receiving of the wireless response signal of the transponder. In some embodiments, one or more rules identifying such responses can be preprogrammed for example at step 735 (shown in phantom). Examples responses and preprogramming of such responses are provided herein below, without limitation. It is understood that such rules can be used to control, modify, or otherwise vary other features of the combined wireless charger-and-interrogator and or of ancillary devices, as in step 745 (shown in phantom). Examples of such other features include without limitation security features, locking mechanisms, data recorders, image recorders, alarms, etc.

Figure 8A:
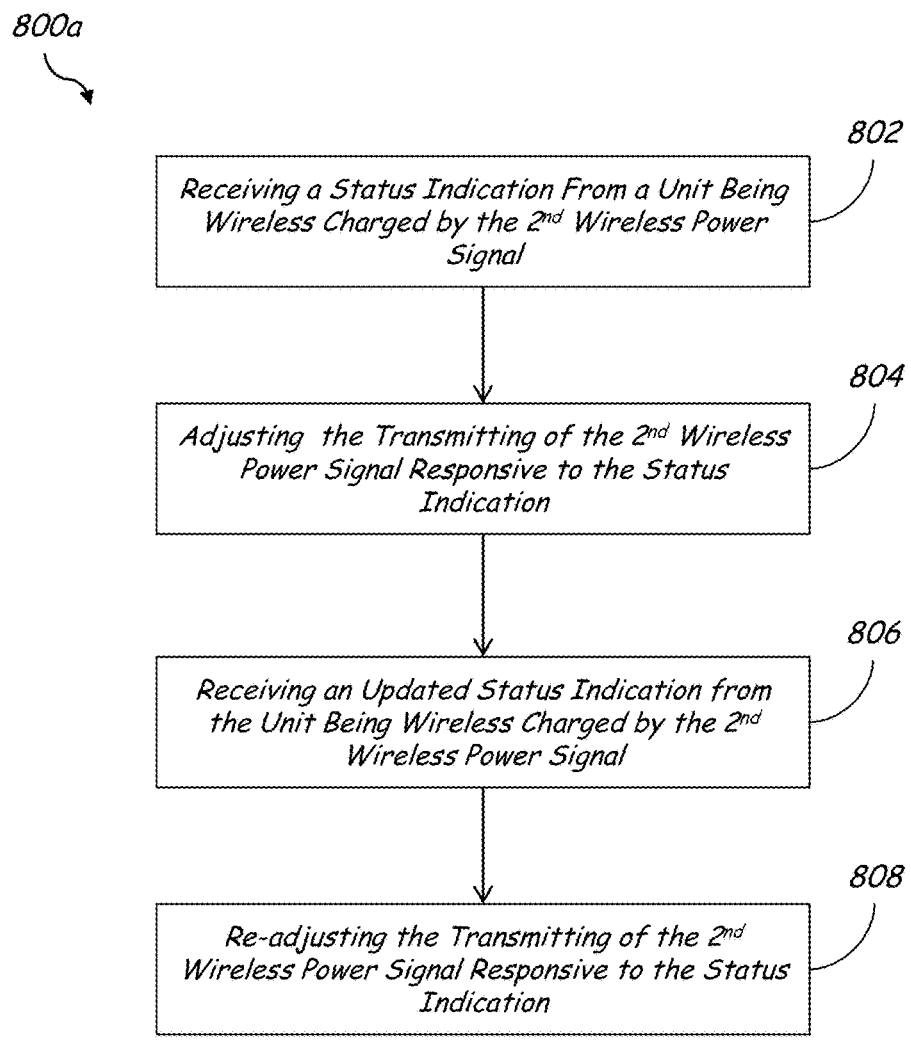
FIGS. 8A-8C illustrate operations performable by a programmable combined wireless charger-and-interrogator in accordance with embodiments of inventive matter disclosed herein.

FIG. 8A illustrates an embodiment of more detailed operations 800a performable by a combined wireless charger-and-interrogator in accordance with embodiments of inventive matter disclosed herein. These steps can be performed in association with either or both of steps 740 and 745 (FIG. 7). The operations 800a comprise step 802 through step 808. In step 802, a status indication is received from a unit to be charged and/or from a unit already under charge by the wireless power charging signal. In step 804, the generation of the wireless power-charging signal is adjusted in response to the status indication received. For example, such a status indication can include a power charge status of the unit to be charged. Thus, a status indication received in step 802 might indicate whether a unit to be charged is fully charged, has a somewhat depleted charge, or has a critically low charge.

It can be advantageous to adjust the generation of the wireless power signal in response to the particular status indication. According to the illustrative example, the combined wireless charger-and-interrogator can prevent generation of the wireless power charging signal in response to a status indication that a device about to be charged is already fully charged. Likewise, the combined wireless charger-and-interrogator can generate a wireless power charging signal in response to a status indication that the charging status of the unit about to be charged is either partially depleted or critically low. The status information can be recorded for example by a controller of the combined wireless charger-and-interrogator to support application of other preprogrammed rules. By way of example such rules may prevent wireless charging under certain circumstances, such as time of day. However such prevention of wireless charging can be overridden by a status indication that the charging status of the unit to be charged is critically low.

In step 806, updated status indications can be received from time to time for the unit to be charged or the unit currently being charged by the wireless power charging signal. In step 808, generation of the wireless power signal can be readjusted in response to any updated status indication. As in the previous example in which a preference to block charging for unit having a charge status that is critically low is overridden can be altered when the charge status of the unit has changed from critically low. For example the unit, upon achieving a minimum threshold charge, may no longer report a status of critically low charge. Noting the changes status the combined wireless charger-and-interrogator can revert to a preferred mode of operation such as prevention of charging according to the preprogrammed rules.

In some embodiments preprogramming of the wireless charging rules as in step 735 can be implemented to provide a measure of safety, for example, to guard against exposure to electromagnetic radiation as might be generated by the combined wireless charger-and-interrogator. By way of example, preprogrammed wireless charging rules can be implemented to prevent wireless charging during certain time periods in which individuals are likely to be in close proximity to the combined wireless charger-and-interrogator. Such time periods can correspond to working hours for a combined wireless charger-and-interrogator located in an office environment or evening hours and weekends for a combined wireless charger-and-interrogator located in a home environment. In operation a unit to be charged placed in close proximity to the combined wireless charger-and-interrogator will be charged at least in part according to the time and or day of the week. Thus, a combined wireless charger-and-interrogator in an office would charge if the time is after hours or if the day is a weekend.

Override features can be provided to allow charging to take place despite preprogrammed time and/or date of the week preferences. An example of such a feature would be to allow and override of a preprogrammed rule to prevent charging, upon a determination that a charging status of the unit to be charged is indicating a critically low charge.

Another example of such a feature would be to allow for a manual override, such as a user accessible button on the combined wireless charger-and-interrogator. In some embodiments the wireless charger and interrogator can include in indicator, such as a light, that wireless power charging is taking place contrary to preferred schedule.

By way of further example, preprogrammed wireless charging rules can be implemented to prevent and/or promote wireless charging responsive to an interrogation of a transponder. Such transponders, e.g., RFID tags, can be carried by individuals and/or placed on personal property. When the RFID tag is close enough to be interrogated and identified by the combined wireless charger-and-interrogator it can be inferred that any individual and/or device associated with the RFID tag is likely to be in close proximity to the combined wireless charger-and-interrogator. For example, wireless charging can be disabled when an RFID tag is detected within proximity of the combined wireless charger-and-interrogator. In some embodiments RFID tags can be associated with individuals and classes of individuals as described herein. One such class of individuals can include children who may be particularly susceptible to the effects of electromagnetic radiation. Thus, an RFID tag can be placed on a child's clothing and/or the child's personal property or equipment, such as an infant carrier, toy or stroller. Other classes of individuals can include adults.

The preprogrammed rules can infer a class or classes of individuals in proximity of the combined wireless charger-and-interrogator according to interrogation replies from a transponder. For example, the combined wireless charger-and-interrogator can completely terminate wireless charging upon detection of an RFID tag associated with a child; whereas, the same combined wireless charger-and-interrogator can reduce charging to a lower power mode, such as a trickle charge, upon detection of an RFID tag associated with an adult. Additional rules can be provided for example at step 735 to allow for interaction between rules associated with RFID tags and rules associated with other aspects such as time and day of the week. Alternatively or in addition individual RFID tags can be associated with customized or preprogrammed rules irrespective of an individual, a class of individuals, an entity, and so forth.

Various power and/or charging control features are disclosed herein relate to use of the wireless charger-and-interrogator with a separate or supporting wireless power source. Examples of such supporting wireless power sources include the first wireless charger 302 (FIG. 3A), providing a first wireless power signal to power the wireless charger-and-interrogator. It is understood that any of the various power and/or charging control features disclosed herein as controlling or otherwise modifying generation of a wireless power signal by the wireless charger and interrogator, can also be used to control wireless power signal produced by the other wireless power source. Such extension of control features from the wireless charger-and-interrogator can be provided, for example, through a communications channel established between the charger-and-interrogator and the other wireless power source. An example of such a communications channel is illustrated by the communications 310 of FIG. 3A. Thus, modification of a wireless power signal for charging the device to be charged, e.g., a second wireless power signal, can also result in a modification of a wireless power signal from the other wireless power source.

Figure 8B:
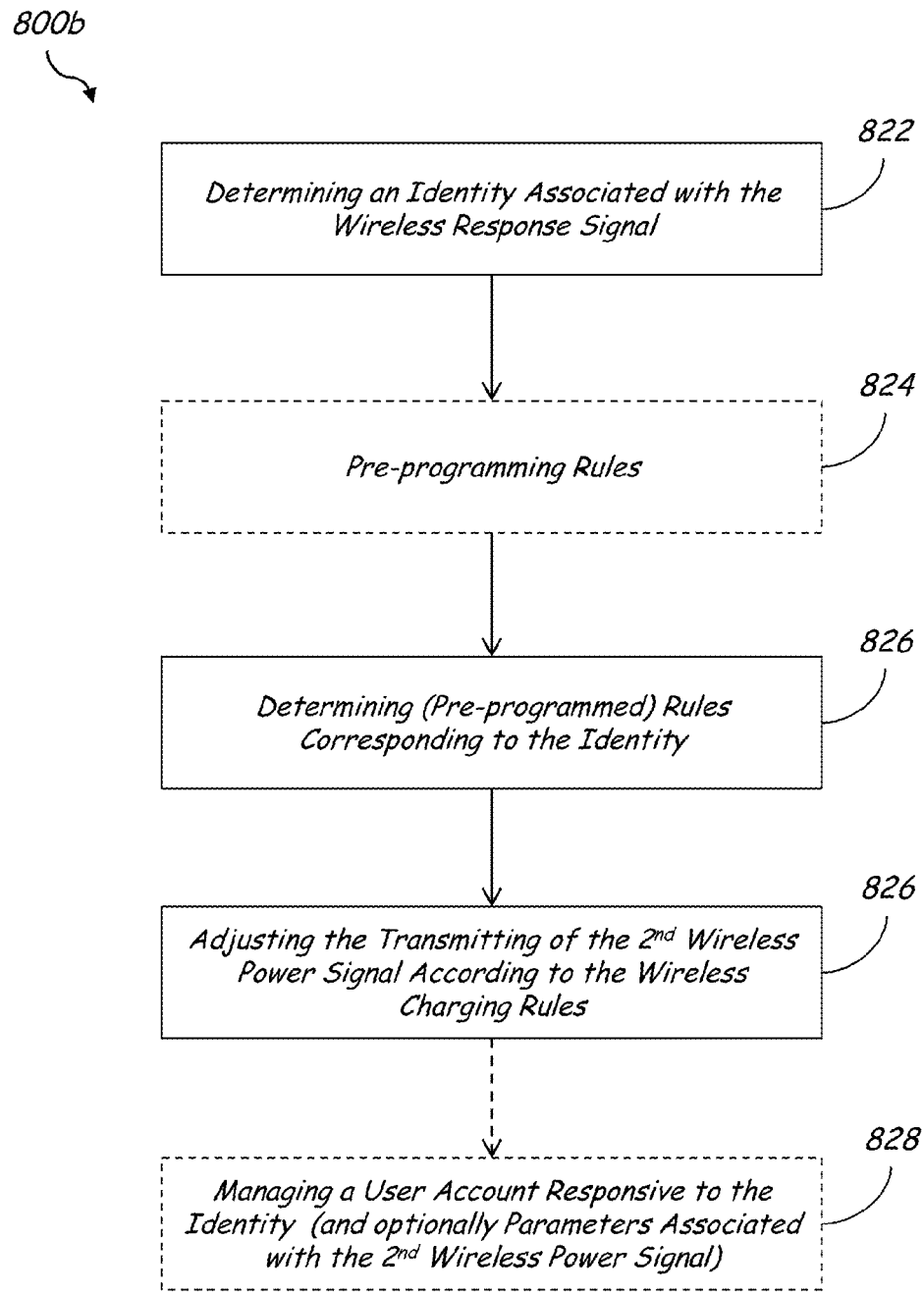

FIG. 8B illustrates another embodiment of more detailed operations 800b performable by a combined wireless charger-and-interrogator in accordance with embodiments of inventive subject matter disclosed herein. These steps can be performed in association with either or both of steps 740 and 745 (FIG. 7). The operations 800b comprise step 822 through step 828. In step 822, information is obtained from the wireless response signal. For example the information can include a means of identification such as an identification code. It is common for RFID transponders to wirelessly return a signal encoded with an identification number, such as a universal product code (UPC) and/or a unique serial number, upon interrogation. In some embodiments, one or more rules can be preprogrammed as in step 824 (shown in phantom). Such preprogrammed rules can be implemented in response to the determining of the identity associated with the wireless response signal as in step 822.

In some embodiments generation of the wireless power charging signal can be adjusted or otherwise altered according to the preprogrammed rules implemented in step 826 upon the determining of the identity associated with the response signal in step 822. By way of example and without limitation the rules corresponding to the identity in step 826 can include an authorization responsive to the determining of the identity associated with a wireless response signal in step 822.

As the transponder may be associated with an individual, a class of individuals, an entity, and the like, such authorization can be determined for the associated individual, class of individuals, entity, and so forth. Such authorizations can be preprogrammed as in step 824 to allow for managed authorization that can be configured and/or reconfigured responsive to preprogramming of the rules in step 824. Thus in individual can associate one or more identities with one or more transponders having known identification codes, such that their identities can be inferred by the detection of the identification code of the transponder in response to wireless interrogation by the combined wireless charger-and-interrogator. Transponders can be carried by an individual for example on an identification card, a key fob, or other suitable token. Alternatively or in addition, transponders can be associated with property. Some examples of property that can be identified by such transponders include electronic equipment such as computers, communication devices, entertainment devices, power tools, transportation devices, documents, briefcases, hand bags, furniture, wireless power charging harnesses, and the like.

In some embodiments a unit to be charged includes a transponder, such as an RFID tag. As the unit is placed nearby to the combined wireless charger-and-interrogator the combined wireless charger-and-interrogator interrogates the RFID tag causing the tag to generate a wireless reply. The combined wireless charger-and-interrogator receives the wireless reply from the nearby unit and interprets encoded information contained within the reply, such as an identification code of the RFID tag. The controller of the combined wireless charger-and-interrogator or a server, such as the remote server 112 illustrated in FIG. 1, can determine whether the identification code of the RFID tag is associated with an authorized individual or entity. The controller and/or server can be preprogrammed to take one or more first actions in response to a determination that the RFID tag is associated with an authorized individual or entity, and/or to take one or more second actions in response to a determination that the RFID tag is not associated with an authorized individual, or class of individuals, or entity.

For example, generation of the wireless power charging signal can be allowed in response to determination that the RFID tag is associated with an authorized individual, or class of individuals, or entity. Classes of individuals can include family members, employees, students, club members, and the like. Entities can include businesses, schools, clubs, other organizations, and the like. In at least some embodiments, authorization to access of products and/or services can be made further contingent upon one or more additional preprogrammed rules in step 824. By way of example an authorized individual can be associated with an account such as a user account, a loyalty awards account, or a prepaid account, e.g., for membership in an organization, for purchase of services, such as wireless power charging services, and the like. Such additional rules can cause the controller and/or server to consult an account status of the authorized individual and or entity. Authorization to access the products and/or services can be contingent upon first identifying the individual and/or entity as being authorized and determining an appropriate account status, such as paid up, active, and the like.

Further rules can be preprogrammed in step 824, for example, to allow the individual or entity to interact with another application, such as and account management application, as in step 828 to perform other tasks related to management of an account, etc. Thus, upon determination that an account has insufficient resources to allow access to the products or services sought by the authorized individual associated with the RFID tag, access to the corresponding account can be provided to the authorized individual or entity to allow for a replenishment of the resources in order to access the products or services sought. In some embodiments the replenishment can be automated such that upon a determination that the corresponding account has insufficient resources, the account can be automatically updated to add resources, for example, by way of a preapproved means, such as a valid credit card, or access to a bank account.

By way of further example, one or more second actions in response to a determination that the RFID tag is not associated with an authorized individual, or class of individuals, or entity can include generation of a message indicating that access to products and/or resources, such as the wireless power charging services discussed herein, is being sought by an unauthorized individual or entity. Such a message can be communicated to a remote entity, such as a remote authorization application running on the server, to a remote service provider, to security authorities such as building security or law enforcement, by way of a wired and/or wireless telecommunication network, cellular, WiFi, etc. Alternatively or in addition, the combined wireless charger-and-interrogator can provide an indication of a location associated with the attempted unauthorized access. The location can be obtained from a location determining device, such as a GPS receiver and/or from a predetermined location of the combined wireless charger-and-interrogator. In some embodiments an approximation of the location can be determined from another device, such as a wireless access point through which a wireless version of the message was sent.

Figure 8C:
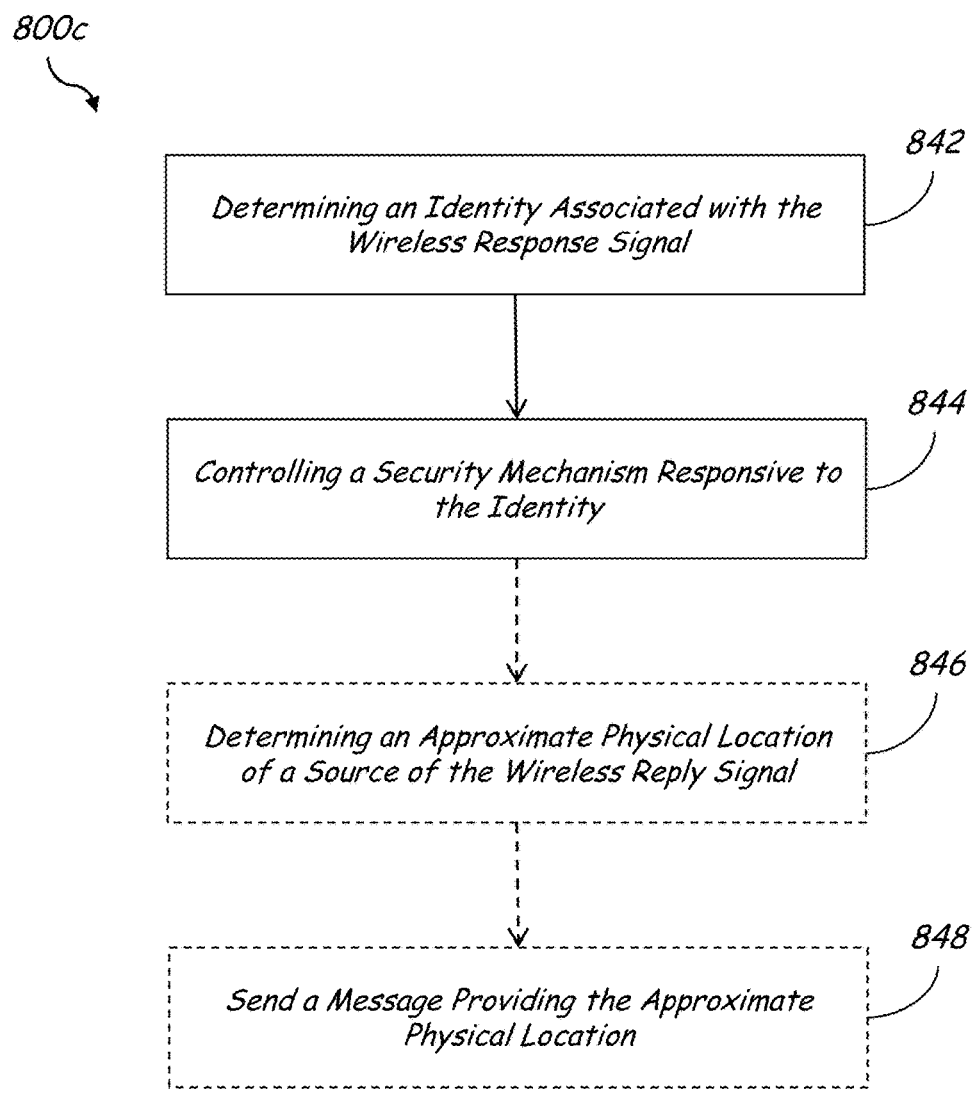

FIG. 8C illustrates another embodiment of more detailed operations 800c performable by a combined wireless charger-and-interrogator in accordance with embodiments of inventive matter disclosed herein. These steps can be performed in association with either or both of steps 740 and 745 (FIG. 7). The operations 800c comprise step 842 through step 848. In step 842, information is obtained from the wireless response signal, such as an identification code associated with a transponder that generated the wireless response signal. In step 844, a security device can be operated in response to the determining of the identity associated with the wireless response signal as in step 842. For example a security device can include a locking mechanism that can be controlled in response to the identity associated with a wireless response signal. Such security devices including locking mechanisms can be used to lock or otherwise secure one or more items. The items can include the unit to be charged. As illustrated in FIG. 3A, the combined wireless charger-and-interrogator 200 includes a locking mechanism 323. Locking mechanism 323 can be used to secure the unit under charge 322 to one or more of the locking mechanism itself 323 or the combined wireless charger-and-interrogator 200, either of which can be anchored to a secure structure, such as the tabletop 304, in order to present removal of the unit under charge 322 from the combined wireless charger-and-interrogator 200, while locked.

In some embodiments the unit under charge 322 is placed within a container, such as a briefcase, handbag, security container, and the like. The container can be placed upon the combined wireless charger-and-interrogator 200, such that wireless charging of the unit under charge 322 can occur wirelessly through the container. In at least some embodiments, referring to FIG. 3B, a container 200' itself serves as the charger and interrogator, for example, including components and functionality disclosed in relation to FIG. 1-2 and FIG. 4. The locking mechanism 323' can be used to control access to an interior of the container 200' as disclosed herein. The locking mechanism 323, 323' can be used to secure the container as described above in relation to the unit under charge 322. Alternatively or in addition the locking mechanism can be configured to lock or otherwise secure the unit under charge within the container. For example the locking mechanism can be a locking mechanism of the briefcase. Removal of either the briefcase or the unit under charge from the briefcase can be prevented or otherwise control by way of a separate transponder (e.g., RFID tag). An authorized user holding such an RFID tag that when brought in close proximity to the combined wireless charger-and-interrogator, allows for identification of the holder of the RFID tag as an authorized individual. Any of the locking mechanisms disclosed herein can be unlocked or otherwise unsecured, for example by an unlocking command from one or more of the controller or the server, upon detection of the RFID tag associated with the authorized individual. The locking mechanism can remain locked or otherwise secured upon interrogation of another RFID tag not associated with an authorized individual or failure to detect such an RFID tag.

In step 846, a determination of an approximate physical location of a source of the wireless reply signal, e.g., a transponder, can be determined. Such determination can be obtained by an estimation that the transponder is close to the combined wireless charger-and-interrogator. When the location of the combined wireless charger-and-interrogator is known a priori, the approximate location of the transponder can be inferred. Alternatively or in addition, a location of the transponder can be inferred from a location of the combined wireless charger-and-interrogator obtained by an external location source, such as a GPS receiver. Step 846 is shown in phantom suggesting that it is an optional step.

In step 848, one or more messages can be sent upon determination that an attempted and/or actual access to or movement of the unit under charge. The messages can include one or more categories of information, such as information identifying the type of message, e.g., unauthorized movement, information identifying an associated time of day and/or date, a location, etc. Step 848 is shown in phantom suggesting that it is an optional step.

Particular embodiments of wireless chargers disclosed herein can operate in accordance with one of a plurality of power-transmission protocols. These wireless charges are referred to herein as programmable.

In some embodiments, a web portal can be hosted by server applications operating from the server 112 illustrated in FIG. 1. Applications can include one or more of authentication applications to manage and track authorized usage and/or unauthorized attempted usage. Alternatively or in addition, applications can include controlling a security device, such as a locking mechanism, in response to determination of an authorized/non-authorized transponder in the vicinity of the combined wireless charger-and-interrogator. Still other applications can allow for management of operation of the wireless charger to selectively prevent wireless charging in relation to safety concerns, and/or managing user accounts, for example, to provide wireless charging services for fee. In a general sense, a general programming application can be provided to allow for development and implementation of user customizable applications.

The web portal can be used for managing services of the combined wireless charger-and-interrogator and other services supported by the combined wireless charger-and-interrogator. A web page of the web portal can be accessed by a Uniform Resource Locator (URL) with an Internet browser such as Microsoft's Internet Explorer™, Mozilla's Firefox™, Apple's Safari™, or Google's Chrome™ using an Internet-capable communication device, such as a personal computer, a portable computer, such as a laptop, a tablet computing device, and a mobile communication device, such as a feature phone or smart phone. The web portal can be configured, for example, to access the user-configurable controller 434, and services managed thereby such as security services, providing controllable access to one or more devices, safety services providing control of the combined wireless charger-and-interrogator to reduce or eliminate generation of a second wireless power signal under certain conditions, business applications, such as providing wireless charging services responsive to identified equipment, identified individuals, identified accounts and/or identified status of such accounts, etc. The web portal can also be used for provisioning wireless power charging services described herein, provisioning other services to equipment and/or authorized users associated with equipment to be charged, and so on.

The communication devices usable with any of the equipment, devices and systems disclosed herein can comprise a wireline and/or wireless transceiver, a wireless remote control, a power supply, a location receiver, a motion sensor, an orientation sensor, and a controller for managing operations thereof. The transceiver can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver can also be adapted to support circuit-switched wireline access technologies (such as PSTN), packet-switched wireline access technologies (such as TCP/IP, VoIP, etc.), and combinations thereof.

The user interface 436 can include a depressible or touch-sensitive keypad with a navigation or pointing mechanism such as a roller ball, a joystick, a mouse, or a navigation disk for manipulating operations of the combined wireless charger-and-interrogator. The keypad can be an integral part of a housing assembly of the combined wireless charger-and-interrogator or an independent device operably coupled thereto by a tethered wireline interface (such as a USB cable) or a wireless interface supporting, for example, Bluetooth. The keypad can represent a numeric keypad commonly used by phones, and/or a QWERTY keypad with alphanumeric keys. The user interface 436 can further include a display such as monochrome or color LCD (Liquid Crystal Display), OLED (Organic Light Emitting Diode) or other suitable display technology for conveying images to an end user of the combined wireless charger-and-interrogator. In an embodiment where the display is touch-sensitive, a portion or all of the keypad can be presented by way of the display with navigation/pointing features.

The user interface 436 can also include an audio system that utilizes audio technology for conveying low volume audio (such as audio heard in proximity of a human ear) and high volume audio (such as speakerphone for hands free operation). The audio system can further include a microphone for receiving audible signals of an end user. The audio system can also be used for voice recognition applications. The user interface 436 can further include an image sensor such as a charged coupled device (CCD) camera for capturing still or moving images.

The controller 434 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the combined wireless charger-and-interrogator.

Other components not shown in the figures can be used in one or more embodiments of the subject disclosure. For instance, the combined wireless charger-and-interrogator can include a reset button (not shown). The reset button can be used to reset the user-configurable controller 210, 434 of the combined wireless charger-and-interrogator 200, 400. In yet another embodiment, the combined wireless charger-and-interrogator can also include a factory default setting button operable to force the combined wireless charger-and-interrogator to re-establish factory settings. The combined wireless charger-and-interrogator can also include a slot for adding or removing another module such as a Subscriber Identity Module (SIM) card. SIM cards can be used for identifying subscriber services, executing programs, storing subscriber data, and so forth.

Upon reviewing the aforementioned embodiments, it would be evident to an artisan with ordinary skill in the art that said embodiments can be modified, reduced, or enhanced without departing from the scope of the claims described below. For example, the interrogator can be replaced by a wireless transceiver adapted to communicate with a remote transceiver or transponder according to the various techniques disclosed herein. Such wireless interrogation and/or communications can include near-field communicators and far-field communicators. Such modes of wireless interrogation can include one or more of radio frequency communications, acoustic communications or light wave communications. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
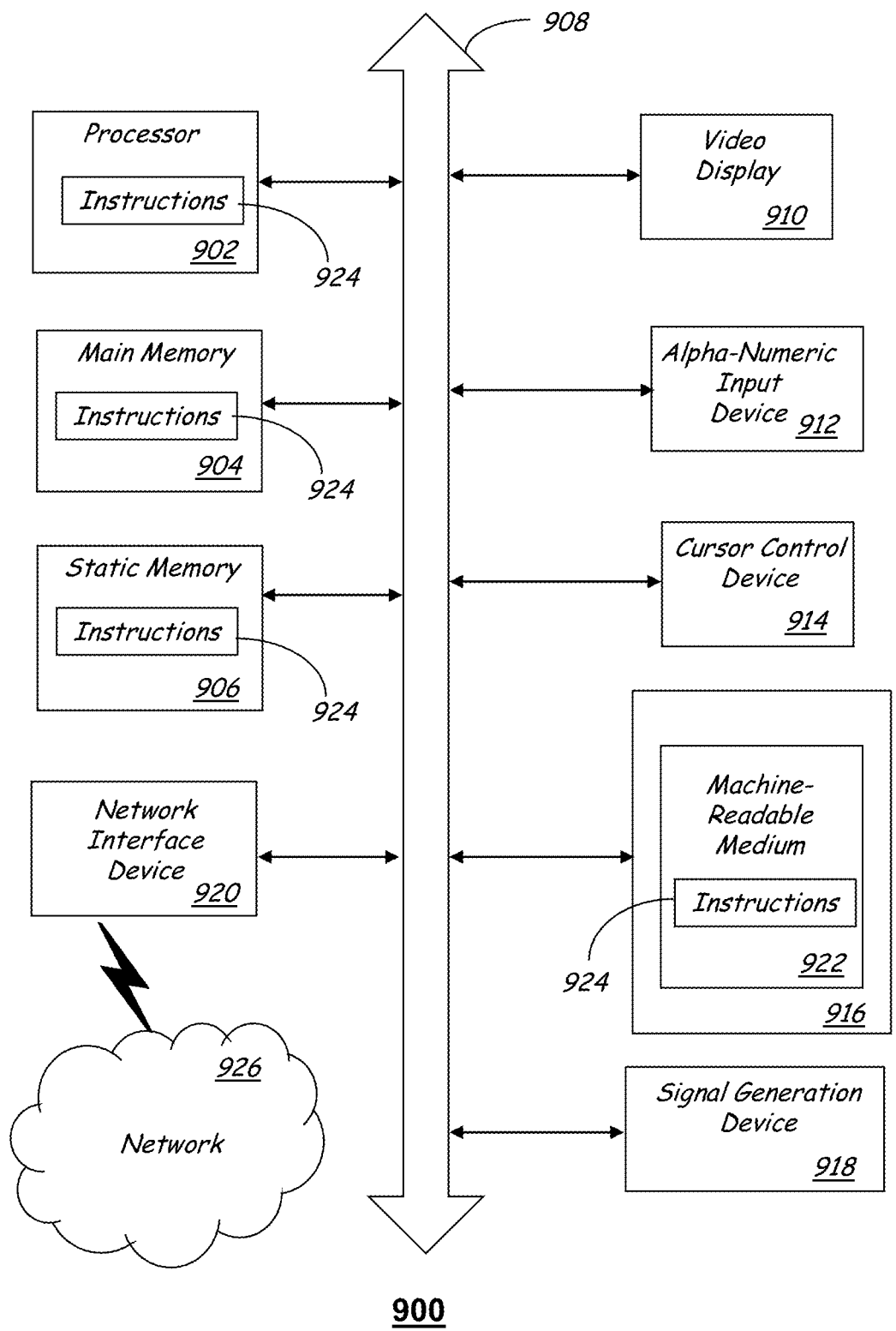
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the server 112 (FIG. 1), the control circuitry 210 (FIG. 2), the power handling circuitry 410, the interrogator 420, and the user configurable controller 434 (FIG. 4). In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a control device of the subject disclosure includes broadly any electronic device that provides a control capability. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within one or more computer-readable storage devices, such as the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless charger, comprising:
   a housing comprising:
      a wireless power-receiving device comprising power receiving circuitry and a power receiving coil located within the housing, wherein the power receiving coil produces a source electrical power signal, responsive to exposure to a wireless power-charging source;
      a separate wireless power-transmitting device comprising power transmitting circuitry that produces a target electrical power signal and a power transmitting coil located within the housing, wherein the power transmitting coil, responsive to stimulation by the target electrical power signal, generates a wireless target power-charging signal according to a selectable power transmission protocol, that wirelessly charges a chargeable device outside of the housing according to the selectable power transmission protocol;
      a power-handling controller comprising electronic hardware coupled between the power receiving circuitry and the power transmitting circuitry, that generates the target electrical power signal according to the selectable power transmission protocol;
      a circuit node coupled between the power transmitting circuitry and the power transmitting coil; and
      interrogation circuitry coupled to the power transmitting coil by way of the circuit node, comprising:
         signal transmitting circuitry that provides a momentary interrogation signal that when applied to the power transmitting coil by way of the circuit node generates the momentary wireless interrogation signal; and
         signal receiving circuitry to obtain information by way of the circuit node from a wireless interrogation response signal received at the power transmitting coil, in response to the power transmitting coil receiving the wireless interrogation response signal, wherein the power-handling controller generates the target electrical power signal based on the source electrical power signal and the wireless interrogation response signal, and
      wherein the wireless target power-charging signal is separated from the wireless interrogation response signal by one of time, frequency or both.

2. The wireless charger of claim 1, wherein the signal transmitting circuitry further comprises a modulator to modulate a coil-driving current of the power transmitting coil via the circuit node to cause the momentary wireless interrogation signal to induce the wireless interrogation response signal from a transponder positioned externally to the housing, and wherein the signal transmitting circuitry facilitates a blanking portion of the target electrical power signal that coincides with the momentary wireless interrogation signal.

3. The wireless charger of claim 1, further comprising a frequency selective component between the circuit node and the signal receiving circuitry to facilitate separation of the power-charging signal from the wireless interrogation response signal, wherein the signal receiving circuitry further comprises a demodulator to obtain information from a current induced in the power transmitting coil, via the circuit node, responsive to the wireless interrogation response signal.

4. The wireless charger of claim 1, wherein the wireless interrogation response signal is received from a transponder selected from a group consisting of a radio frequency identification device, a near field communication device and any combination thereof, and wherein the power transmission protocol is a standardized wireless power transmission protocol.

5. The wireless charger of claim 1, further comprising a security device in communication with the interrogation circuitry, wherein the security device is controllable according to the wireless interrogation response signal.

6. The wireless charger of claim 5, wherein the security device further comprises a locking mechanism to provide a locking feature, wherein the locking feature is controllable based on the interrogation signal.

7. The wireless charger of claim 1, further comprising:
   a user-configurable controller in communication with the power-handling controller and the interrogation circuitry; and
   a user interface to support configuration of the user-configurable controller.

8. A method, comprising:
   receiving, by a processing system including a processor, a first wireless power signal by way of a power-receiving coil;
   generating, by the processing system, a transmitting coil-drive current responsive to the receiving of the first wireless power signal;
   generating, by the processing system, a second wireless power signal, by way of a power-transmitting coil, in response to the generating of the transmitting coil-drive current;
   generating, by the processing system, an electrical interrogation signal;

combining, by the processing system, the second wireless power signal and the electrical interrogation signal at a common circuit node;

transmitting, by the processing system, a second wireless power signal according to a selectable power transmission protocol, based on the second wireless power signal, and a wireless interrogation signal, based on the electrical interrogation signal, by way of the power-transmitting coil, wherein the second wireless power signal electrically charges a chargeable unit, and wherein the wireless interrogation signal causes a transponder associated with the chargeable unit to generate a wireless interrogation reply signal; and receiving, by the processing system, by way of the power-transmitting coil, the wireless interrogation reply signal associated with the chargeable unit contemporaneous with the transmitting of the second wireless power signal, wherein the second wireless power signal is based on the wireless interrogation reply signal, and wherein the second wireless power signal and the wireless interrogation reply signal are separated by any one of time, frequency or both.

9. The method of claim 8, further comprising:
providing blanking portion of the second wireless power signal that coincides with the wireless interrogation reply signal; and
adjusting, by the processing system, the transmitting coil-drive current responsive to the receiving of the wireless interrogation reply signal.

10. The method of claim 9, further comprising:
determining, by the processing system, a charge status of a unit charging from the second wireless power signal; and
modifying, by the processing system, the adjusting of the transmitting coil-drive current responsive to the charge status.

11. The method of claim 8, further comprising:
separating, by the processing system, the second wireless power signal and the wireless interrogation reply signal based on a frequency selective component; and
determining, by the processing system, from the wireless interrogation reply signal, an identity associated with the transponder.

12. The method of claim 11, further comprising adjusting, by the processing system, the transmitting coil-drive current responsive to the identity.

13. The method of claim 11, further comprising controlling, by the processing system, a security mechanism responsive to the identity.

14. The method of claim 13, further comprising:
determining, by the processing system, an approximation of a physical location of the transponder; and
reporting, by the processing system, the approximation of the physical location to an application server.

15. A wireless-charging system, comprising:
a power-receiving coil to generate an electrical current in response to a first wireless power signal;
power conversion circuitry coupled to the power-receiving coil to convert the electrical current to a coil-driving current;
a power-transmitting coil coupled to the power conversion circuitry via a circuit node, that transmits a second wireless power signal according to a selectable power transmission protocol and responsive to the coil-driving current, and an interrogation signal coupled to the power transmitting coil via the circuit node, wherein the second wireless power signal electrically charges a chargeable unit according to the selectable power transmission protocol, and wherein the interrogation signal causes a transponder associated with the chargeable unit to generate a wireless reply signal, wherein the power-transmitting coil receives the wireless reply signal separable from the second wireless power signal by one of time, frequency or both; and
a controller in communication with the power-transmitting coil, wherein the controller comprises:
a memory that stores executable instructions; and
a processing system that includes a processor in communication with the memory, wherein the processing system, responsive to executing the instructions, performs operations comprising:
determining from the wireless reply signal that the transponder is proximate to the power-transmitting coil.

16. The wireless-charging system of claim 15, wherein the operations further comprise adjusting, by the system, the coil-driving current responsive to the receiving of the wireless reply signal, and wherein the second wireless power signal comprises a blanking portion contemporaneous with the wireless reply signal.

17. The wireless-charging system of claim 16, wherein the operations further comprise:
determining a charge status of a unit charging from the second wireless power signal; and
modifying the adjusting of the coil-driving current responsive to the charge status.

18. The wireless-charging system of claim 15, wherein the operations further comprise:
separating the second wireless power signal and the wireless reply signal based on a frequency selective component; and
determining from the wireless reply signal, an identity associated with the transponder.

19. The wireless-charging system of claim 18, wherein the operations further comprise adjusting the coil-driving current responsive to the identity, and wherein the frequency selective component comprises a filter.

20. The wireless-charging system of claim 18, wherein the operations further comprise controlling a security mechanism responsive to the identity.

21. The wireless-charging system of claim 20, wherein the operations further comprise:
determining an approximation of a physical location of the transponder; and
reporting, by the system, the approximation of the physical location to an application server.

* * * * *